US010530456B2

(12) United States Patent
Ng et al.

(10) Patent No.: US 10,530,456 B2
(45) Date of Patent: Jan. 7, 2020

(54) METHODS OF RADIO FRONT-END BEAM MANAGEMENT FOR 5G TERMINALS

(71) Applicant: Samsung Electronics Co., Ltd., Suwon-si, Gyeonggi-do (KR)

(72) Inventors: Boon Loong Ng, Plano, TX (US); Jianhua Mo, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/272,900

(22) Filed: Feb. 11, 2019

(65) Prior Publication Data
US 2019/0288766 A1 Sep. 19, 2019

Related U.S. Application Data

(60) Provisional application No. 62/643,518, filed on Mar. 15, 2018, provisional application No. 62/716,577, (Continued)

(51) Int. Cl.
H04B 7/08 (2006.01)
H04B 17/26 (2015.01)
(Continued)

(52) U.S. Cl.
CPC .......... H04B 7/0888 (2013.01); H04B 7/088 (2013.01); H04B 17/26 (2015.01); H04B 17/27 (2015.01);
(Continued)

(58) Field of Classification Search
CPC .... H04B 7/0695; H04B 7/088; H04B 7/0888; H04B 17/26; H04B 17/27; H04B 17/309; H04B 17/318; H04B 17/391; H04W 48/16
See application file for complete search history.

(56) References Cited

U.S. PATENT DOCUMENTS

2008/0020772 A1  1/2008  Shen et al.
2014/0146794 A1  5/2014  Dalsgaard
(Continued)

FOREIGN PATENT DOCUMENTS

WO  2017184190 A1  10/2017

OTHER PUBLICATIONS

International Search Report dated Jun. 26, 2019 in connection with International Patent Application No. PCT/KR2019/003041, 3 pages.
(Continued)

Primary Examiner — David B Lugo

(57) ABSTRACT

A method of a user equipment (UE) for beam management is provided. The method comprises storing a database comprising information regarding UE-specific conditions that are detectable by the UE, wherein each of the UE-specific conditions is prioritized, determining whether a UE-specific condition is detected, updating the database including the UE-specific condition based on a result of the determination, re-prioritizing each of the UE-specific conditions included in the database based on a usage probability of the UE-specific condition, generating a searching sequence for beam management based on the database, wherein the searching sequence is mapped to each of the UE-specific conditions, and performing the beam management based on the generated searching sequence.

20 Claims, 22 Drawing Sheets

Related U.S. Application Data filed on Aug. 9, 2018, provisional application No. 62/740,571, filed on Oct. 3, 2018.

(51) Int. Cl.
*H04W 48/16* (2009.01)
*H04B 17/309* (2015.01)
*H04B 17/391* (2015.01)
*H04B 17/27* (2015.01)

(52) U.S. Cl.
CPC ......... *H04B 17/309* (2015.01); *H04B 17/391* (2015.01); *H04W 48/16* (2013.01)

(56) References Cited

U.S. PATENT DOCUMENTS

| | | | |
|---|---|---|---|
| 2016/0323898 A1* | 11/2016 | Jo | H04B 7/0617 |
| 2016/0353467 A1 | 12/2016 | Nekovee | |
| 2017/0180038 A1 | 6/2017 | Oza et al. | |
| 2017/0339662 A1 | 11/2017 | Lin et al. | |
| 2018/0374495 A1* | 12/2018 | Fienberg | G10L 21/0216 |
| 2019/0097712 A1* | 3/2019 | Singh | H04B 7/08 |

OTHER PUBLICATIONS

Written Opinion of the International Searching Authority dated Jun. 26, 2019 in connection with International Patent Application No. PCT/KR2019/003041, 4 pages.

\* cited by examiner

METHODS OF RADIO FRONT-END BEAM MANAGEMENT FOR 5G TERMINALS

CROSS-REFERENCE TO RELATED APPLICATION(S) AND CLAIM OF PRIORITY

The present application claims priority to:
U.S. Provisional Patent Application Ser. No. 62/643,518, filed on Mar. 15, 2018;
U.S. Provisional Patent Application Ser. No. 62/716,577, filed on Aug. 9, 2018; and
U.S. Provisional Patent Application Ser. No. 62/740,571, filed on Oct. 3, 2018.
The content of the above-identified patent documents are incorporated herein by reference.

TECHNICAL FIELD

The present application relates generally to beam management. More specifically, this disclosure relates to radio front-end beam management for an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide radio front-end beam management for an advanced communication system.

In one embodiment, a user equipment (UE) in a wireless communication system is provided. The UE comprises a memory configured to store a database comprising information regarding UE-specific conditions that are detectable by the UE, wherein each of the UE-specific conditions is prioritized. The UE further comprises at least one processor operably connected to the memory, the at least one processor configured to determine whether a UE-specific condition is detected, update the database including the UE-specific condition based on a result of the determination, re-prioritize each of the UE-specific conditions included in the database based on a usage probability of the UE-specific condition, generate a searching sequence for beam management based on the database, wherein the searching sequence is mapped to each of the UE-specific conditions, and perform the beam management based on the generated searching sequence.

In another embodiment, a method of a user equipment (UE) for beam management is provided. The method comprises storing a database comprising information regarding UE-specific conditions that are detectable by the UE, wherein each of the UE-specific conditions is prioritized, determining whether a UE-specific condition is detected, updating the database including the UE-specific condition based on a result of the determination, re-prioritizing each of the UE-specific conditions included in the database based on a usage probability of the UE-specific condition, generating a searching sequence for beam management based on the database, wherein the searching sequence is mapped to each of the UE-specific conditions, performing the beam management based on the generated searching sequence.

In yet another embodiment, a non-transitory computer readable medium comprising instructions is provided. When executed by at least one processor of a user equipment (UE), the instructions cause the UE to control a memory configured to store a database comprising information regarding UE-specific conditions that are detectable by the UE, wherein each of the UE-specific conditions is prioritized, determine whether a UE-specific condition is detected, update the database including the UE-specific condition based on a result of the determination, re-prioritize each of the UE-specific conditions included in the database based on a usage probability of the UE-specific condition, generate a searching sequence for beam management based on the database, wherein the searching sequence is mapped to each of the UE-specific conditions; and perform the beam management based on the generated searching sequence.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD- MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
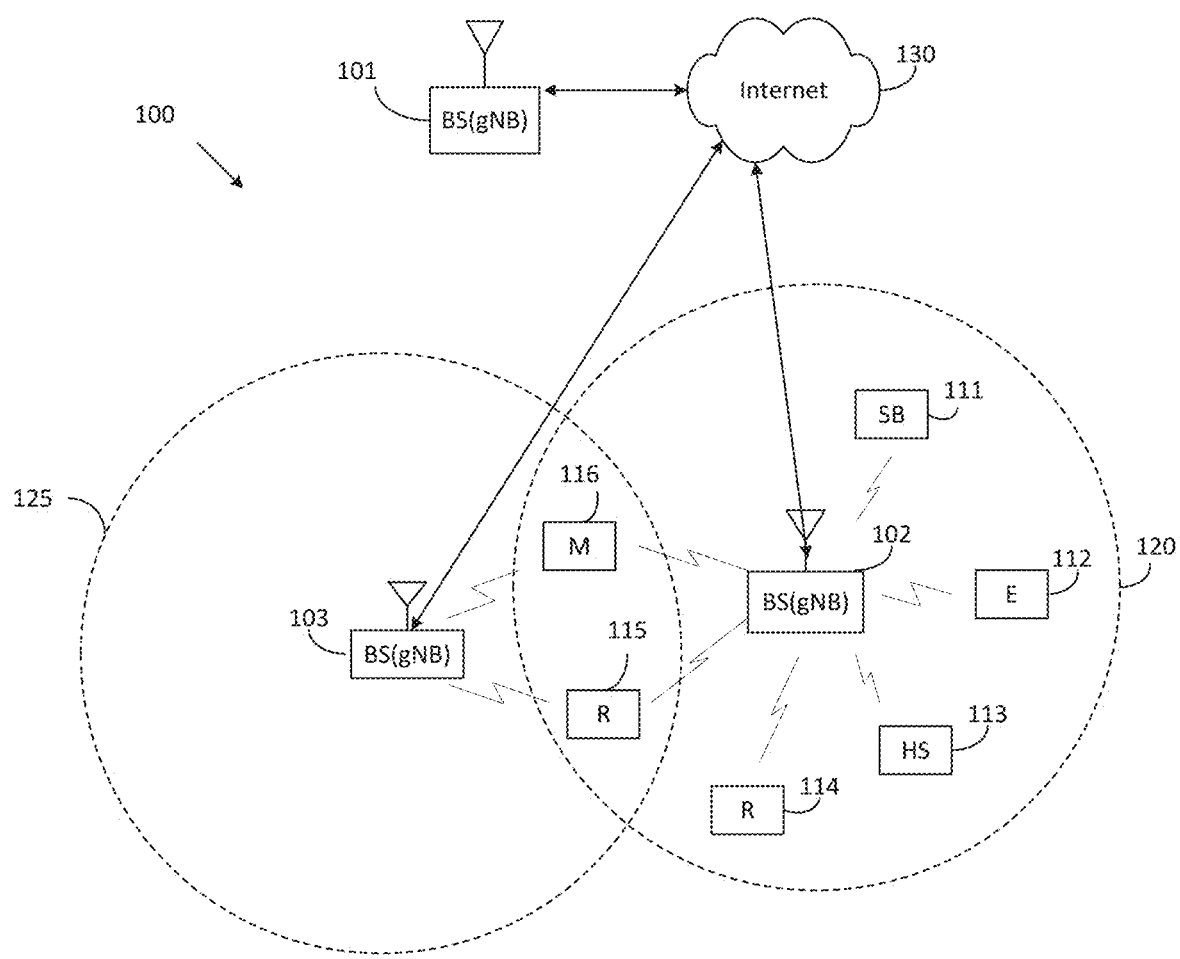
FIG. 1 illustrates an example wireless network according to embodiments of the present disclosure.
Figure 2:
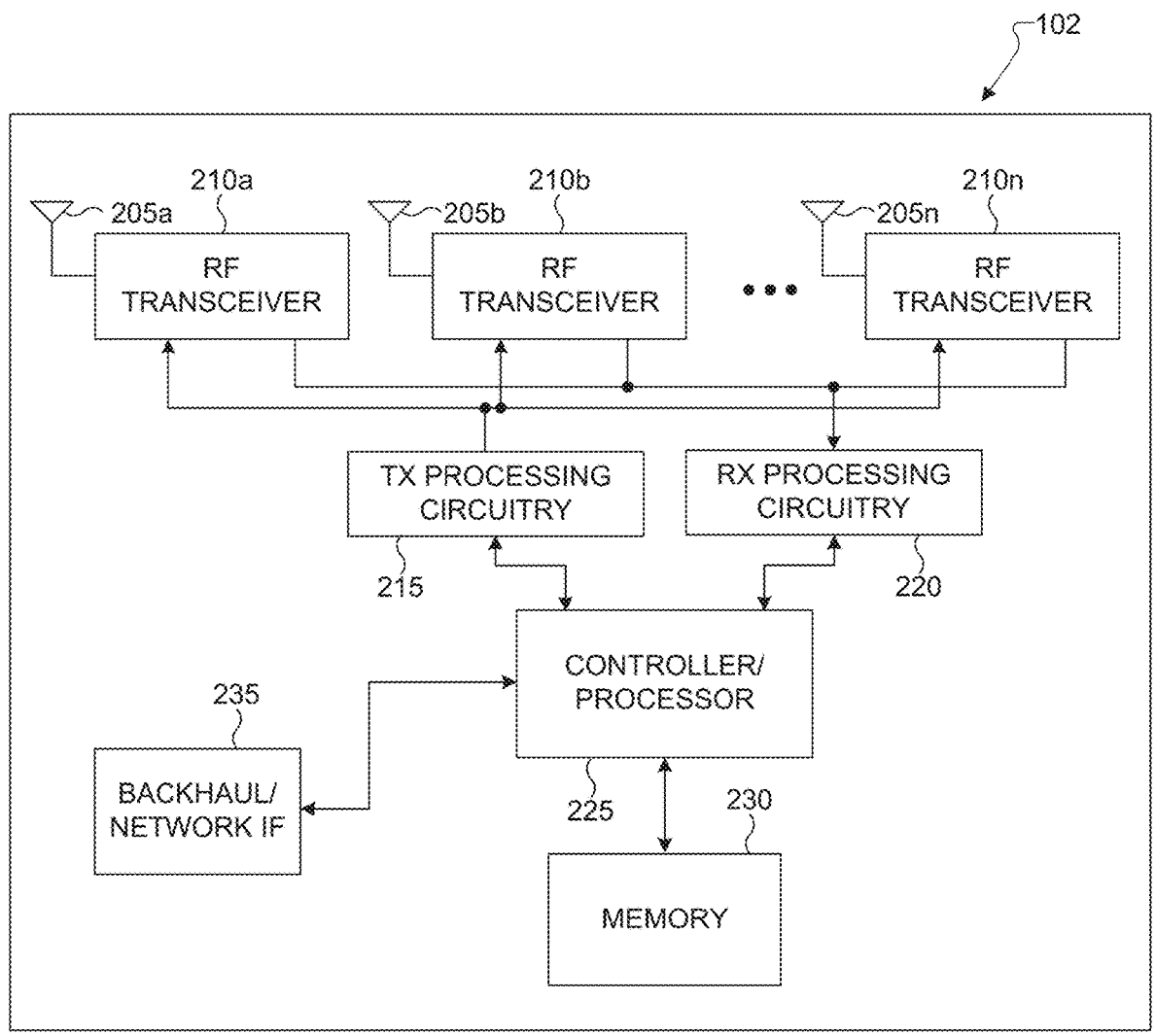
FIG. 2 illustrates an example gNB according to embodiments of the present disclosure.
Figure 3:
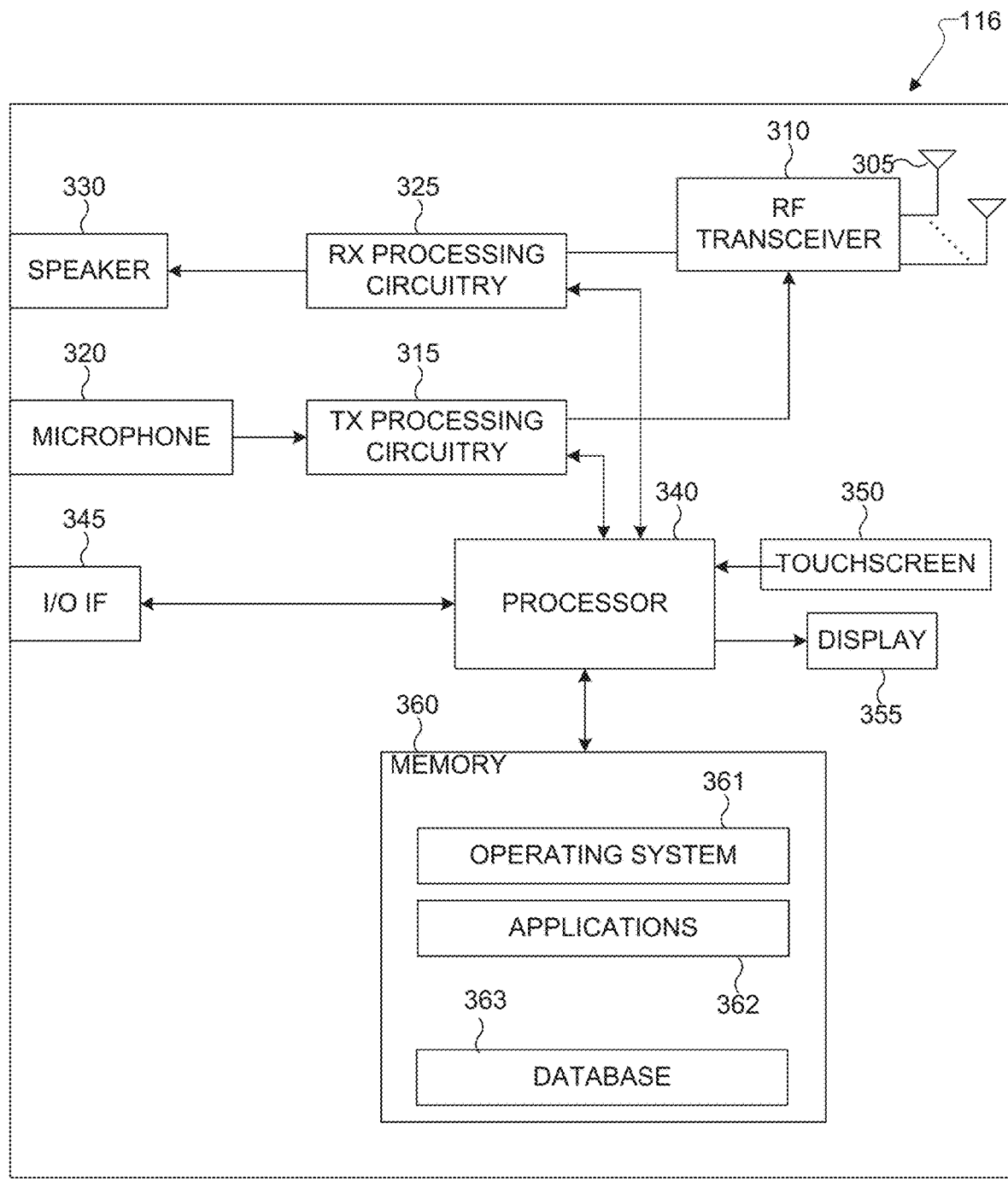
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam management for 5G terminals. In certain embodiments, and one or more of the gNBs 101-103 includes circuitry, programing, or a combination thereof, for efficient beam management for 5G terminals.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361, one or more applications 362, and a database 363. The database 363 may be prioritized based on content saved in the database 363. For example, some of UE-specific information may be prioritized and saved in the database 363 based on usage probability of each of the UE-specific information.

In one embodiment, the processor 340 controls a memory configured to store a prioritized database comprising information regarding UE-specific conditions that are detectable by the UE, wherein each of the UE-specific conditions is prioritized, determine whether a UE-specific condition is detected, update the prioritized database including the UE-specific condition based on a result of the determination, re-prioritize each of the UE-specific conditions included in the prioritized database based on a usage probability of the UE-specific condition.

In one embodiment the processor 340 is configured to generate a searching sequence for beam management based on the prioritized database, wherein the searching sequence is mapped to each of the UE-specific conditions, and perform the beam management based on the generated searching sequence.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
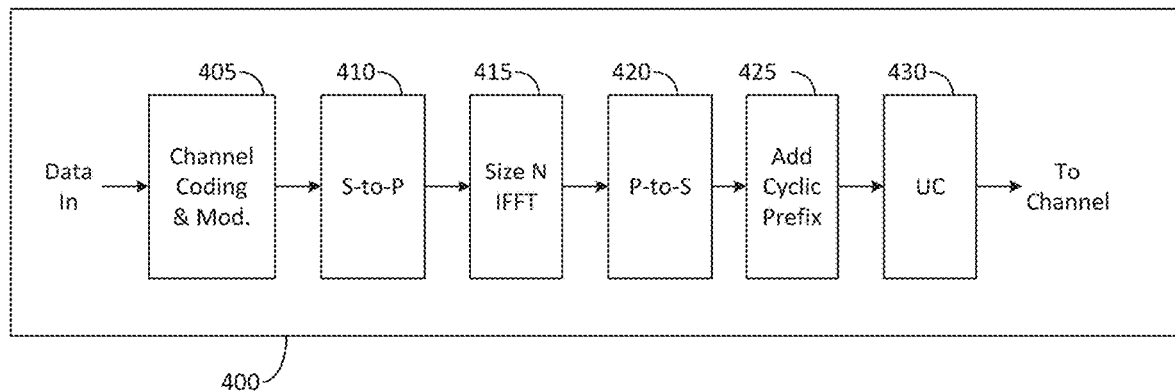
FIG. 4A illustrates a high-level diagram of an orthogonal frequency division multiple access transmit path according to embodiments of the present disclosure.
Figure 4B:
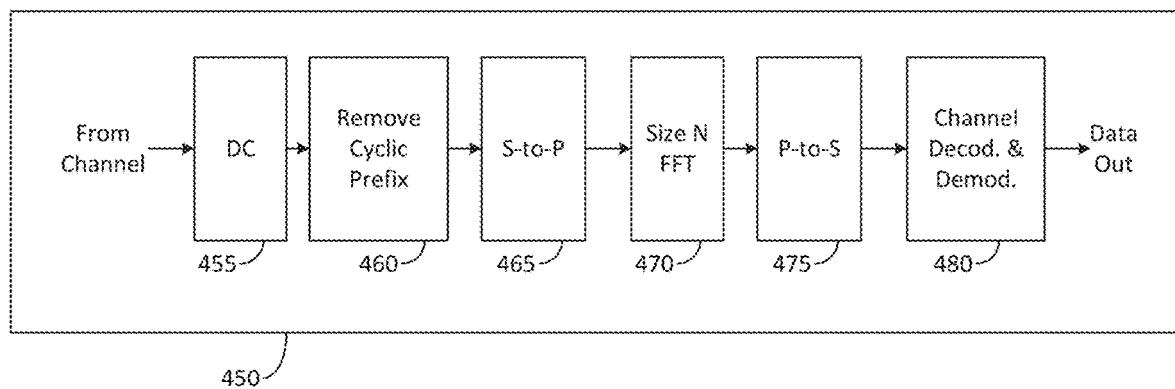
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB. The present disclosure does not limit a usage of eNB or gNB in a type of wireless communication systems.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
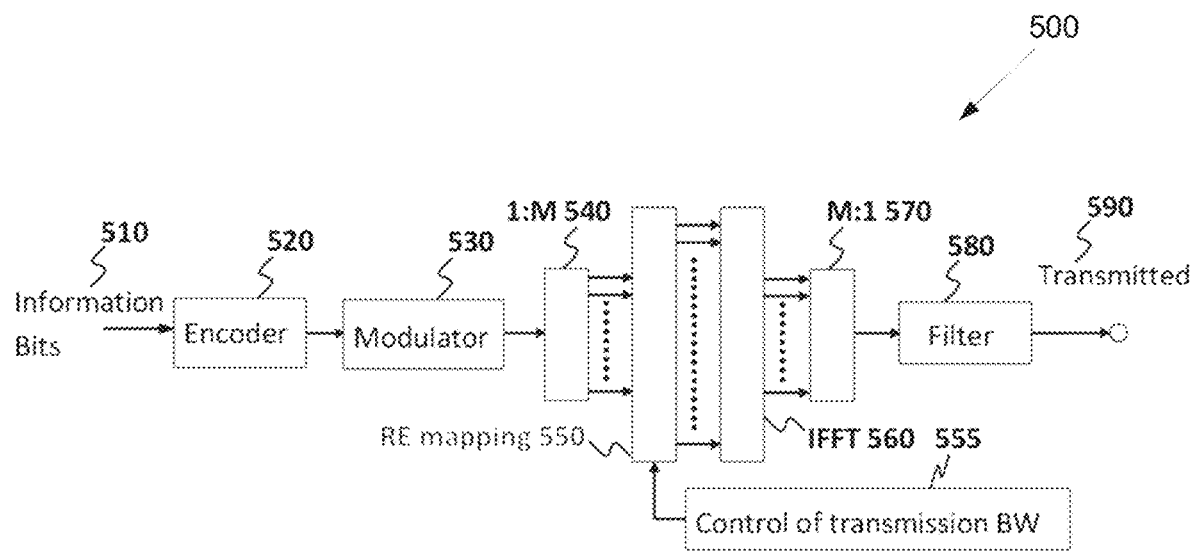
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a channel encoder (e.g., turbo encoder for LTE and/or LDPC encoder for NR), and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
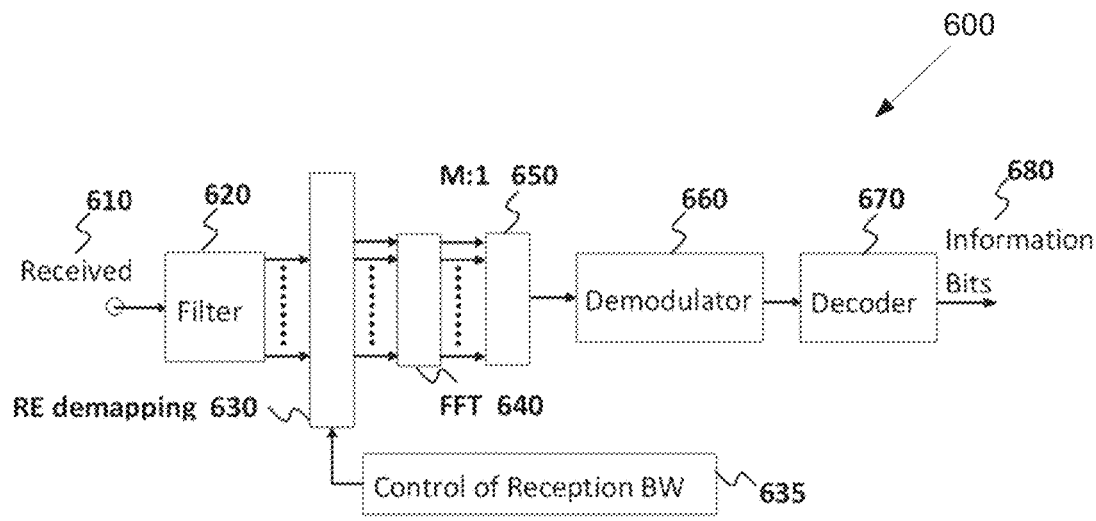
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
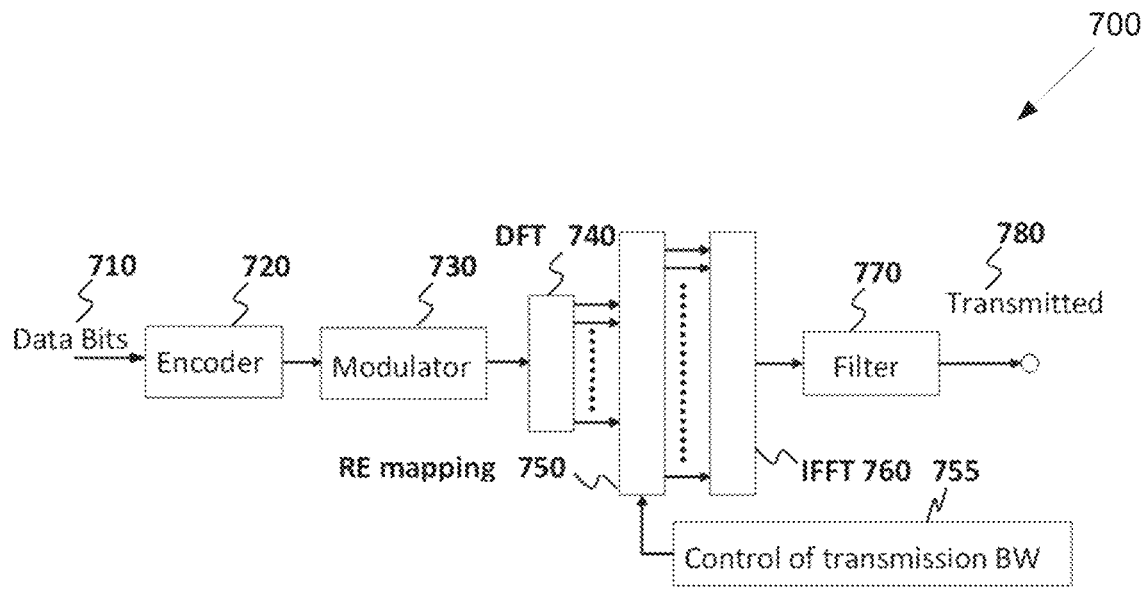
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
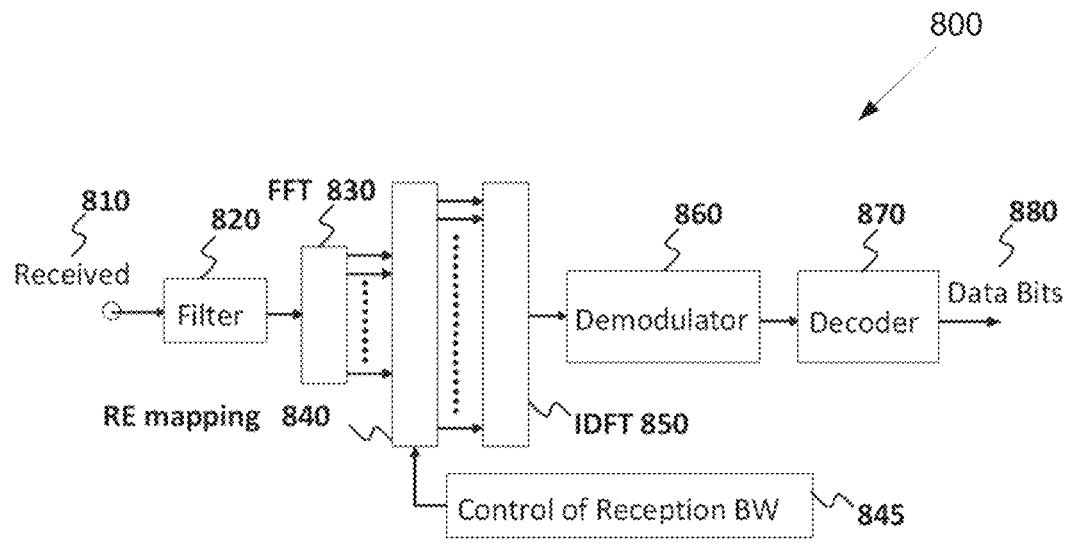
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a channel decoder (e.g., turbo decoder for LTE and/or LDPC decoder for NR), decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
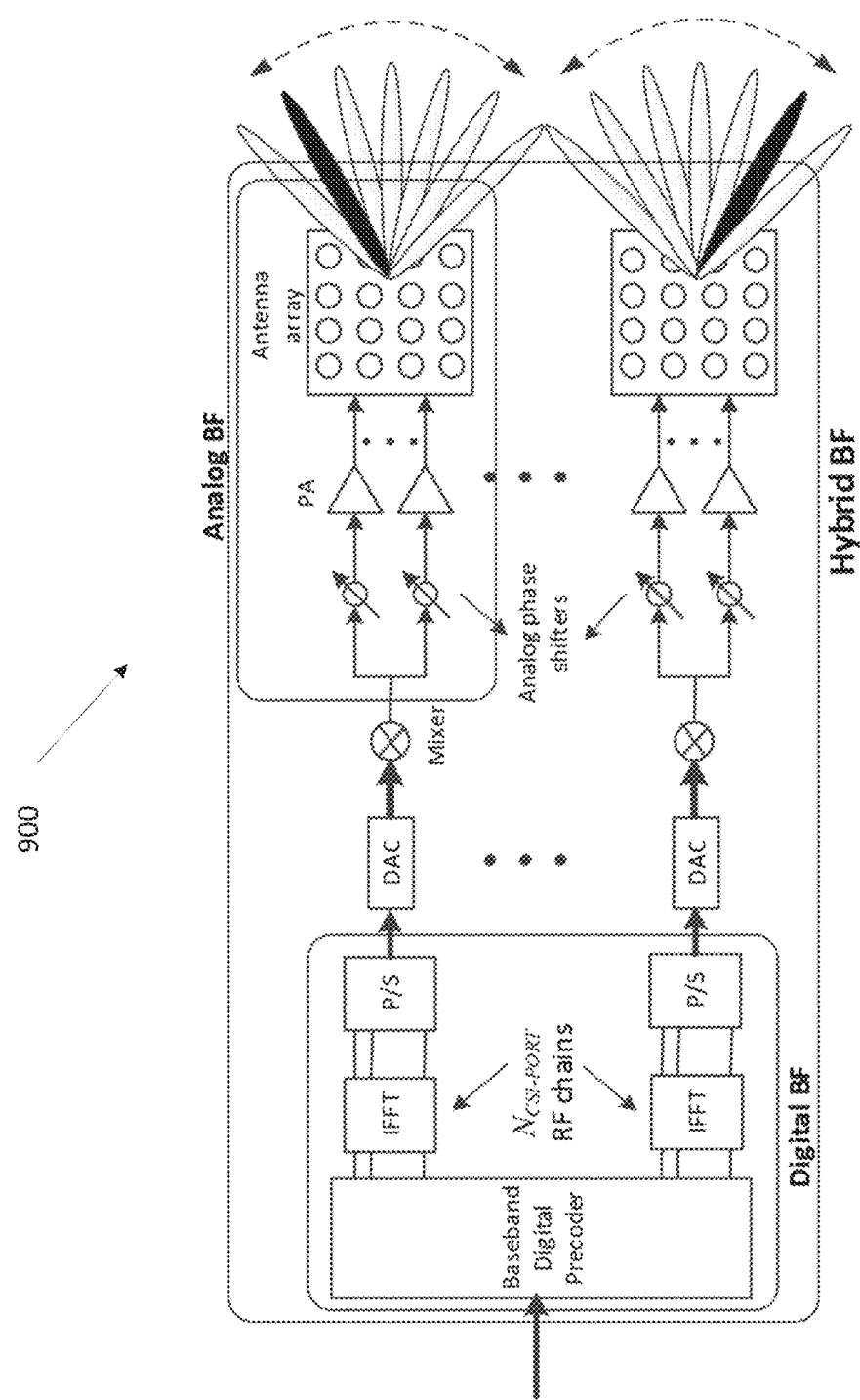
FIG. 9 illustrates an example multiplexing of two slices according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

Figure 10:
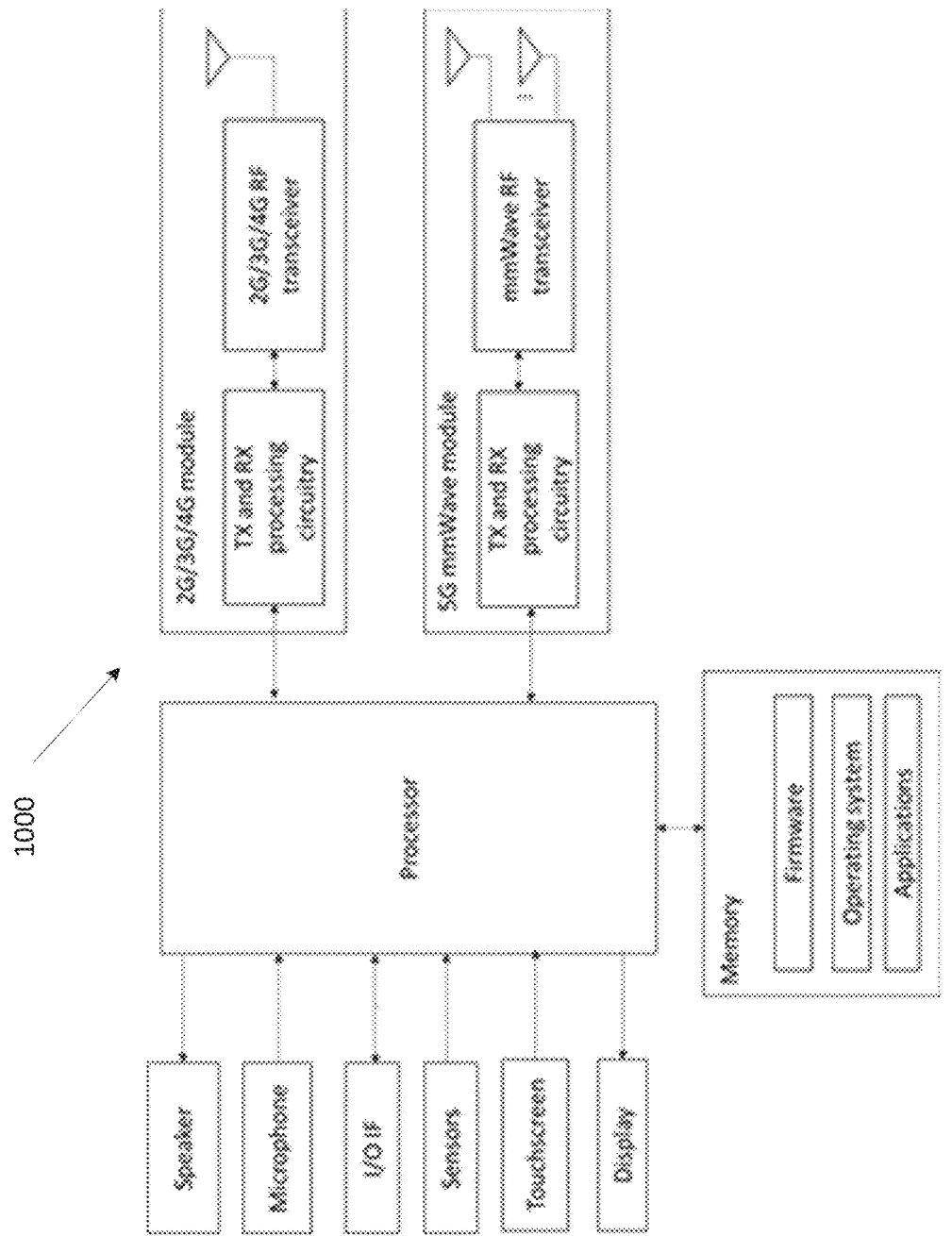
FIG. 10 illustrates an example user equipment according to embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In LTE, a number of CSI reporting modes exist for both periodic (PUCCH-based) and aperiodic (PUSCH-based) CSI reporting. Each CSI reporting mode is depend on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

To assist the UE in determining RX and/or TX beam of the UE, a beam sweeping procedure is employed consisting of the gNB transmitting a set of transmit beams to sweep the cell area and the UE measuring the signal quality on different beams using the UE's receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of TX beams for reception of PDCCH and/or PDSCH.

FIG. 10 illustrates an example user equipment 1000 according to embodiments of the present disclosure. The embodiment of the user equipment 1000 illustrated in FIG. 10 is for illustration only. FIG. 10 does not limit the scope of this disclosure to any particular implementation.

As shown in FIG. 10, the UE includes a 2G/3G/4G communication module and a 5G mmWave communication module. Each communication module includes one or more antennas, one radio frequency (RF) transceiver, transmit (TX) and receive (RX) processing circuitry. The UE also includes a speaker, a processor, an input/output (I/O) interface (IF), one or more sensors (touch sensor(s), proximity sensor(s), gyroscope, etc.), a touchscreen, a display, and a memory. The memory includes, a firmware, an operating system (OS) and one or more applications.

The RF transceiver receives, from the antenna, an incoming RF signal transmitted by an eNB/gNB of the network. The RF transceiver down-converts the incoming RF signal to generate an intermediate frequency (IF) or baseband signal. The IF or baseband signal is sent to the RX processing circuitry, which generates a processed baseband signal by filtering, decoding, and/or digitizing the baseband or IF signal. The RX processing circuitry transmits the processed baseband signal to the processor for further processing (such as for voice or web browsing data).

The TX processing circuitry receives outgoing baseband data (such as voice, web data, e-mail, or interactive video game data) from the processor. The TX processing circuitry encodes, multiplexes, and/or digitizes the outgoing baseband data to generate a processed baseband or IF signal. The RF transceiver receives the outgoing processed baseband or IF signal from the TX processing circuitry and up-converts the baseband or IF signal to an RF signal that is transmitted via the antenna The processor can include one or more processors and execute the basic OS program stored in the memory in order to control the overall operation of the UE. In one such operation, the main processor controls the reception of forward channel signals and the transmission of reverse channel signals by the RF transceiver, the RX processing circuitry, and the TX processing circuitry in accordance with well-known principles. The main processor can also include processing circuitry configured to allocate one or more resources.

For example, the processor can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. downlink control information (DCI) serves several purposes and is conveyed through DCI formats in respective PDCCHs. For example, a DCI format may correspond to a downlink assignment for PDSCH receptions or to an uplink grant for PUSCH transmissions. In some embodiments, the processor includes at least one microprocessor or microcontroller.

The processor is also capable of executing other processes and programs resident in the memory, such as operations for inter-eNB/gNB coordination schemes to support inter-eNB/gNB carrier aggregation. It should be understood that inter-eNB/gNB carrier aggregation can also be referred to as dual connectivity. The processor can move data into or out of the memory as required by an executing process. In some embodiments, the processor is configured to execute a plurality of applications, such as applications for MU-MIMO communications, including obtaining control channel elements of PDCCHs.

The processor can operate the plurality of applications based on the OS program or in response to a signal received from an eNB/gNB. The main processor is also coupled to the I/O interface, which provides UE with the ability to connect to other devices such as laptop computers and handheld computers. The I/O interface is the communication path between these accessories and the main controller.

The processor is also coupled to the touchscreen and the display. The operator of the UE can use the touchscreen to enter data into the UE. The display may be a liquid crystal display, light emitting diode display, or other display capable of rendering text and/or at least limited graphics, such as from web sites.

The memory is coupled to the processor. Part of the memory could include a random access memory (RAM), and another part of the memory could include a Flash memory or other read-only memory (ROM).

Although FIG. 10 illustrates one example of UE, various changes may be made to FIG. 10. For example, various components in FIG. 10 could be combined, further subdivided, or omitted and additional components could be added according to particular needs. As a particular example, the processor could be divided into multiple processors, such as one or more central processing units (CPUs) and one or more graphics processing units (GPUs). Also, while FIG. 10 illustrates the UE configured as a mobile telephone or smartphone, UEs could be configured to operate as other types of mobile or stationary devices.

A 5G terminal or a UE can be equipped with multiple antenna elements. Beamforming is an important factor when the UE tries to establish a connection with a BS station. To compensate for the narrower analog beamwidth in mmWave, analog beams sweeping can be employed to enable wider signal reception or transmission coverage for the UE.

A beam codebook comprises a set of codewords, where a codeword may be a set of analog phase shift values, or a set of amplitude plus phase shift values, applied to the antenna elements, in order to form an analog beam. Give a set of beam codebook, the beams can be swept one by one, for example, from left to right in the horizontal domain, from top to down in the elevational domain.

In one embodiment, it may be referred to system optimization as the design of procedure/algorithm to determine which RF beam(s) in which RF module of the UE to employ given a UE-specific condition. UE-specific condition can be determined by the channel condition as well as the protocol state of the UE. Channel condition includes desired and interfering signal channel conditions, effects of UE orientation, hand or body or object blockages, and movement of the UE. Protocol state refers to the UE modem's connectivity status or activity.

For example, the UE can be in state of initial access, or handover. It can be in the RRC connected state, RRC idle state or RRC inactive state. It can be in the state of receiving or transmitting broadcast or unicast signals or both. It can be in the state of receiving or transmitting control channel, data channel or both. It may be referred to protocol state as one or more of the aforementioned modem connectivity activities.

Figure 11:
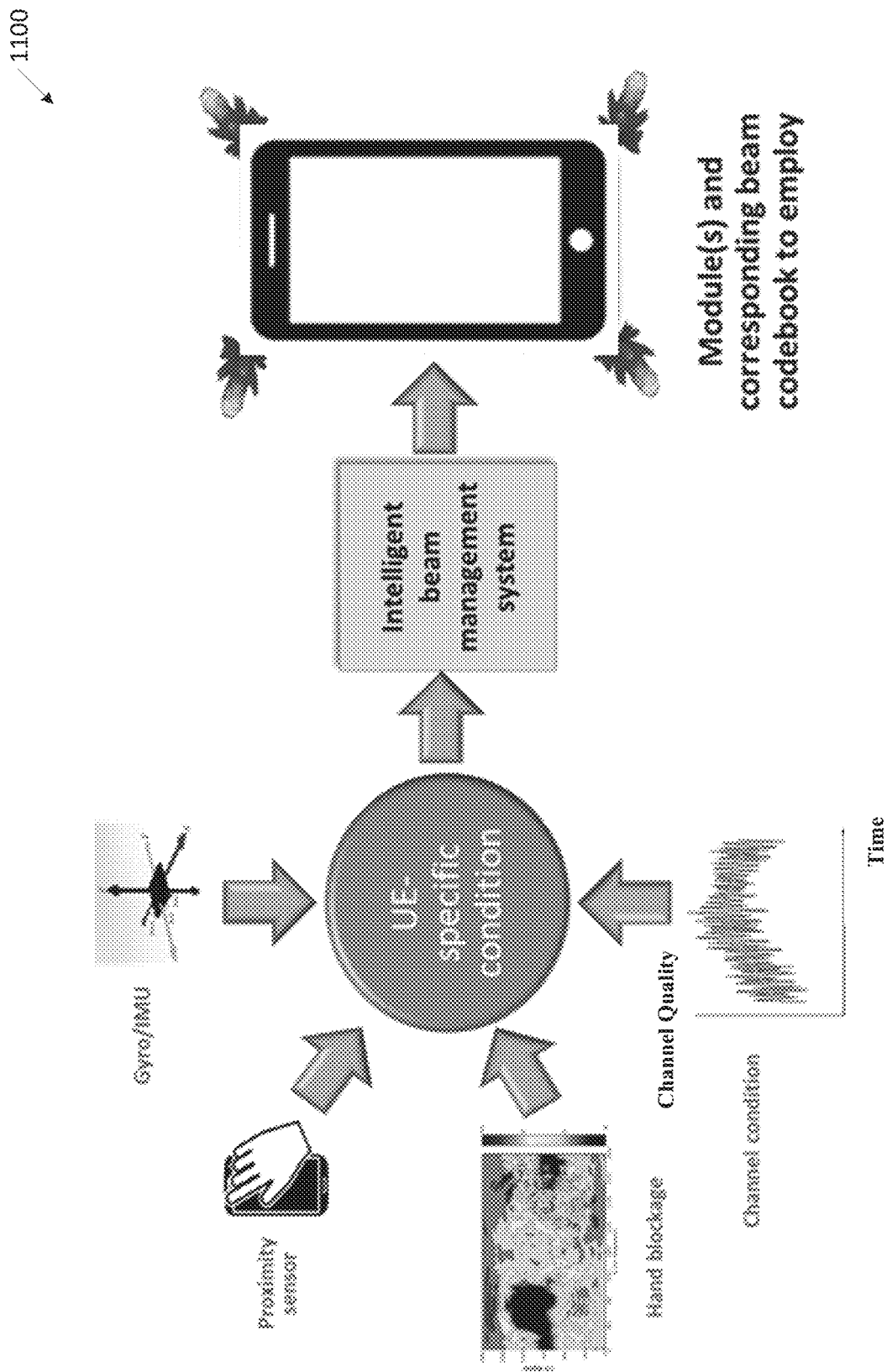
FIG. 11 illustrates an example system optimization overview according to embodiments of the present disclosure.

FIG. 11 illustrates an example system optimization overview 1100 according to embodiments of the present disclosure. The embodiment of the system optimization overview 1100 illustrated in FIG. 11 is for illustration only. FIG. 11 does not limit the scope of this disclosure to any particular implementation.

An overview of the provided system optimization is illustrated in FIG. 11. The UE-specific condition is determined based on inputs from sensors on the terminal such as gyroscope, inertial measurement unit (IMU), proximity sensor, GPS receiver, hand or body blockage detection and channel condition. The UE-specific condition is an input to an intelligent beam management system, which controls the RF module and the analog beams to employ.

Figure 12:
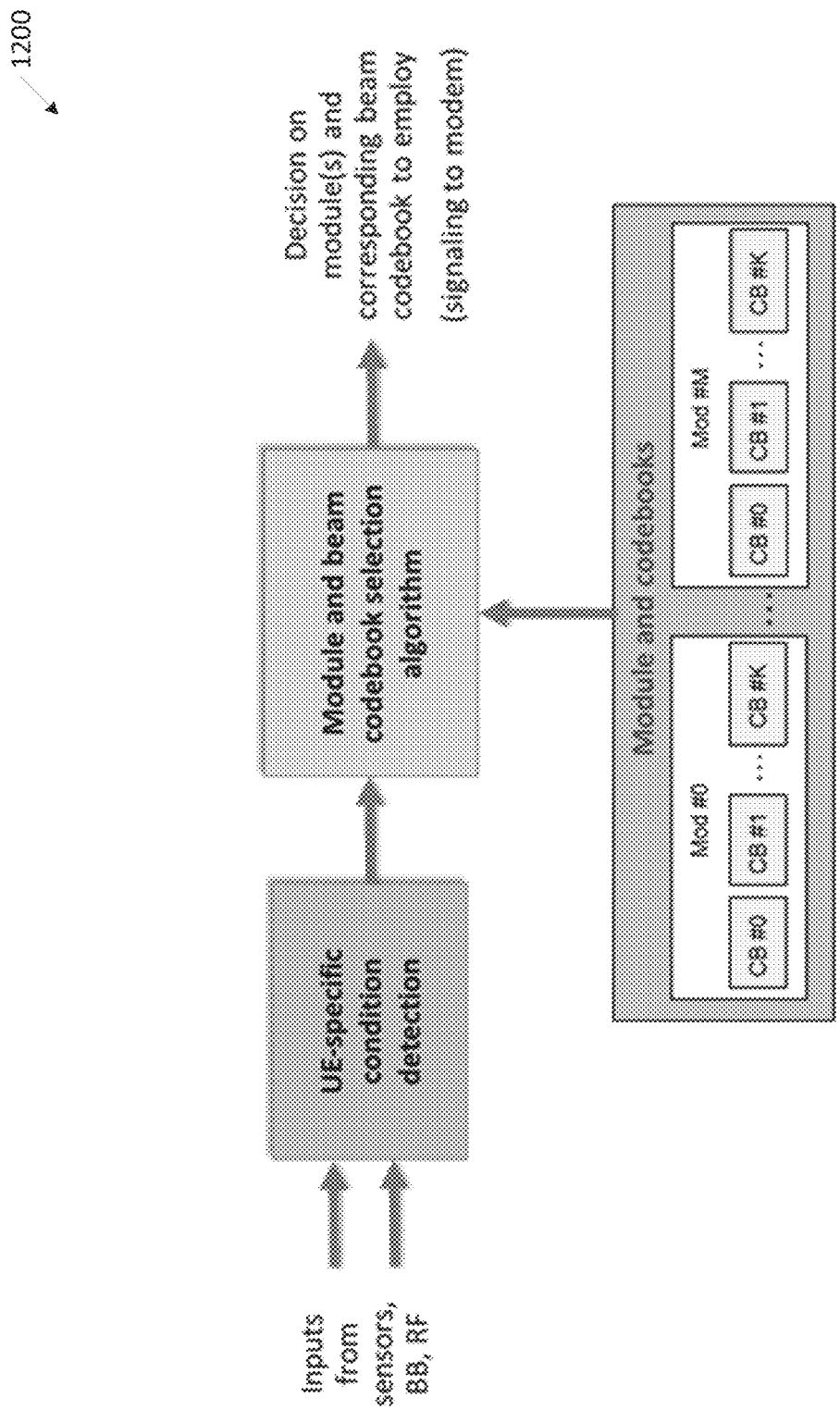
FIG. 12 illustrates an example system optimization framework according to embodiments of the present disclosure.

FIG. 12 illustrates an example system optimization framework 1200 according to embodiments of the present disclosure. The embodiment of the system optimization framework 1200 illustrated in FIG. 12 is for illustration only. FIG. 12 does not limit the scope of this disclosure to any particular implementation.

The framework includes 3 modules (e.g., circuits). The first module is the UE-specific condition detection module, which takes inputs such as measurements from the sensors, the 5G modem baseband (BB) and the RF modules. The UE-specific condition detection module outputs the UE-specific condition. The second module is the module which performs RF module and RF/analog beam codebook selection algorithm. The third module is the codebook module which stores the RF/analog beam codebooks for the RF modules. The second module takes the UE-specific condition and the beam codebooks from the third module as inputs and outputs the decision on the RF module(s) and the corresponding beam codebook to employ.

The outputs can be signaled to the 5G BB module or to the RF modules. In one example architecture, the second module and the third module are combined as one module. In another example of architecture, the first, second and the third modules are combined as one module.

In initial access, the UE performs cell searching and the random access procedure to access a detected cell. In a 5G NR mmWave network, the gNB performs transmit beam sweeping on the synchronization signal block (SSB), over the range of angles as determined by the desired cell coverage. The UE may also perform Rx beam sweeping to detect and identify the strongest SSB beam from the gNB. Assuming a beam is formed by applying phase shifts on the antenna elements, the number of beams is a function of the number of phase shifter bits and the number of antenna elements.

For example, for 3-bit phase shifter and 4 antenna elements, the number of beams is $2^{3 \cdot 4}=4096$. Beam sweeping over this large number of beams can incur excessive latency, hence there is a need for a method to reduce the latency. The UE Rx beam as can be designed to be "broad" or "narrow." Broad beams have a lower beamforming gain but larger beamwidth which can reduce cell searching time if the link quality is sufficient. Narrow beams have a higher beamforming gain but smaller beamwidth which can increase cell searching time, however the higher beamforming gain may be necessary to extend range/coverage.

The definition of "broad" and "narrow" beams can be generalized to represent the beam spherical coverage characteristic. Spherical coverage of a beam can be represented as a cumulative distribution function (CDF) of sampled gain of a beam over the sphere or a target spatial coverage region. A beam is relatively "broad" if the gain CDF curve is relatively steep in gradient. After initial access, the UE may use the same beam used for initial access for basic connection or fall-back connection to the cell, e.g. for determining the Tx beam for physical random access channel transmission, for receiving broadcast, downlink control and fall-back data channel and for determining the Tx beam for control and uplink control and fall-back data channel.

In one embodiment, a $1^{st}$ set of UE Rx beams are first utilized to detect or receive the SSB signals in cell searching. If a suitable cell to access is found with a UE Rx beam, the UE uses the Rx beam to access the cell; else if no suitable cell is found using the $1^{st}$ set of UE Rx beams, the UE uses a $2^{nd}$ set of UE Rx beams to detect or receive the SSB signals in cell searching.

Figure 13:
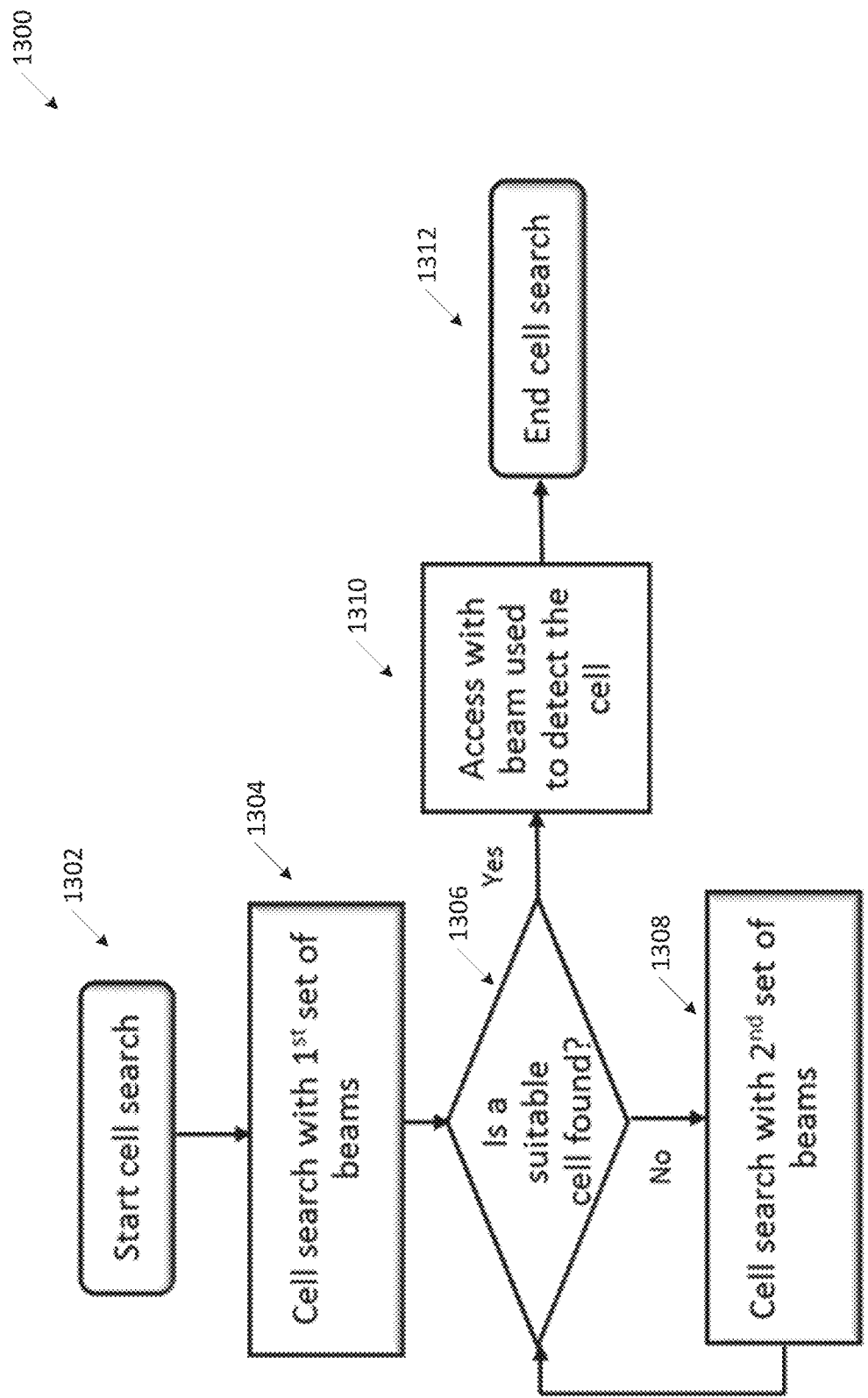
FIG. 13 illustrates a flow chart of a method for cell searching procedure with two sets of beams according to embodiments of the present disclosure.

FIG. 13 illustrates a flow chart of a method 1300 for cell searching procedure with two sets of beams according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the method 1300 starts a cell search. In step 1304, the method 1300 performs the cell search with $1^{st}$ set of beams. In step 1306, the method 1300 determines whether a suitable cell is found. If the suitable is found in step 1306, the method 1300 performs step 1310. In step 1310, the method 1300 performs an access with beam used to detect the cell. In step 1312, the method performs a cell search. In step 1306, if no suitable cell found, the method 1300 performs cell search with $2^{nd}$ set of beams in step 1308.

A suitable cell is the cell that provides sufficient signal quality for connection, e.g. the signal-to-interference-and-noise ratio (SINR) is above a certain threshold, and/or if the reference signal received power (RSRP) of the SSB is above a certain threshold. The procedure is illustrated in FIG. 13.

In one example, the $1^{st}$ set of beams is a set of broad beams, and the $2^{nd}$ set of beams is a set of narrow beams. The aforementioned sets of beams can be represented as beam codebooks. The procedure can be extended in a straightforward manner to more than two sets of beams.

Figure 14:
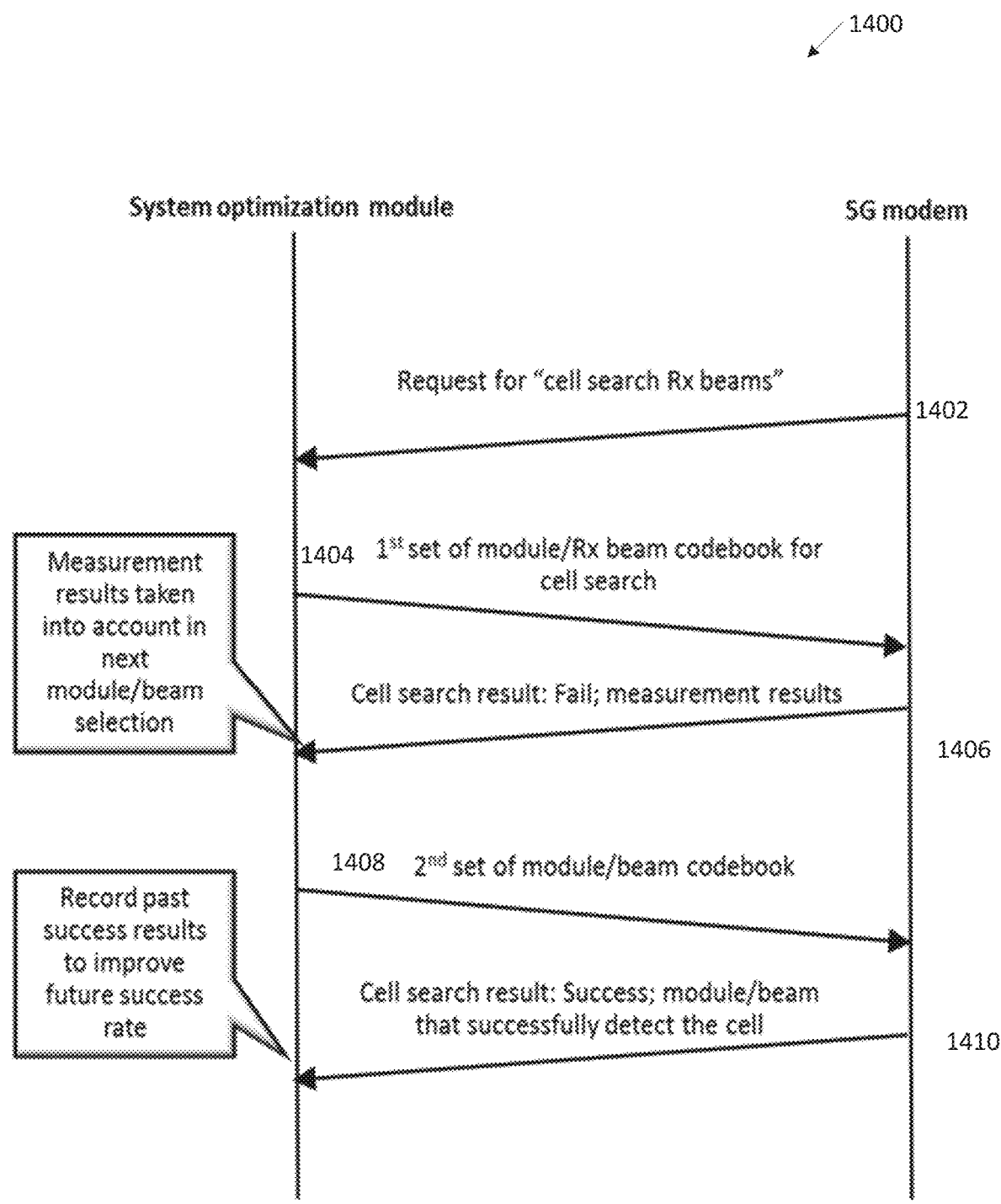
FIG. 14 illustrates a flow chart of a method for signaling message exchanging according to embodiments of the present disclosure.

FIG. 14 illustrates a flow chart of a method 1400 for signaling message exchanging according to embodiments of the present disclosure. The embodiment of the method 1400 illustrated in FIG. 14 is for illustration only. FIG. 14 does not limit the scope of this disclosure to any particular implementation.

As illustrated in FIG. 14, a 5G modem sends a request for cell search RX beams to a system optimization module in step 1402. In step 1404, the system optimization module sends a $1^{st}$ set of module/Rx beam codebook for cell search to the 5G modem. In step 1406, the 5G modem sends cell search results (e.g., fail, measurement results). In step 1408, the system optimization module sends a $2^{nd}$ set of module/beam codebook to the 5G modem. In step 1410, the 5G modem sends cell search results (e.g., success, module/beam that successfully detects the cell).

An example of messaging flowchart between the system optimization module and the 5G modem which implements the procedure as described in FIG. 13 is given in FIG. 14.

The 5G modem first sends a request to obtain configuration of "cell search Rx beams" from the system optimization module. In response to the request, the system optimization module sends the configuration of a first set of RF module and beam codebook (e.g. for broad beams) for cell search by the 5G modem. If the cell search result is failed, the search results as well as the measurement results are sent to the system optimization module. Based on these inputs, the system optimization module determines the $2^{nd}$ set of RF module and beam codebook (e.g. for narrow beams) to be utilized by the 5G modem in the next round of cell search. The measurement results can assist the system optimization module in prioritizing RF module which registers better measurement results in the next round of cell search. If the result of the second round is positive, the RF module and beam codebook (or the beam index) that are used to detect the cell successfully is sent to the system optimization module.

Figure 15:
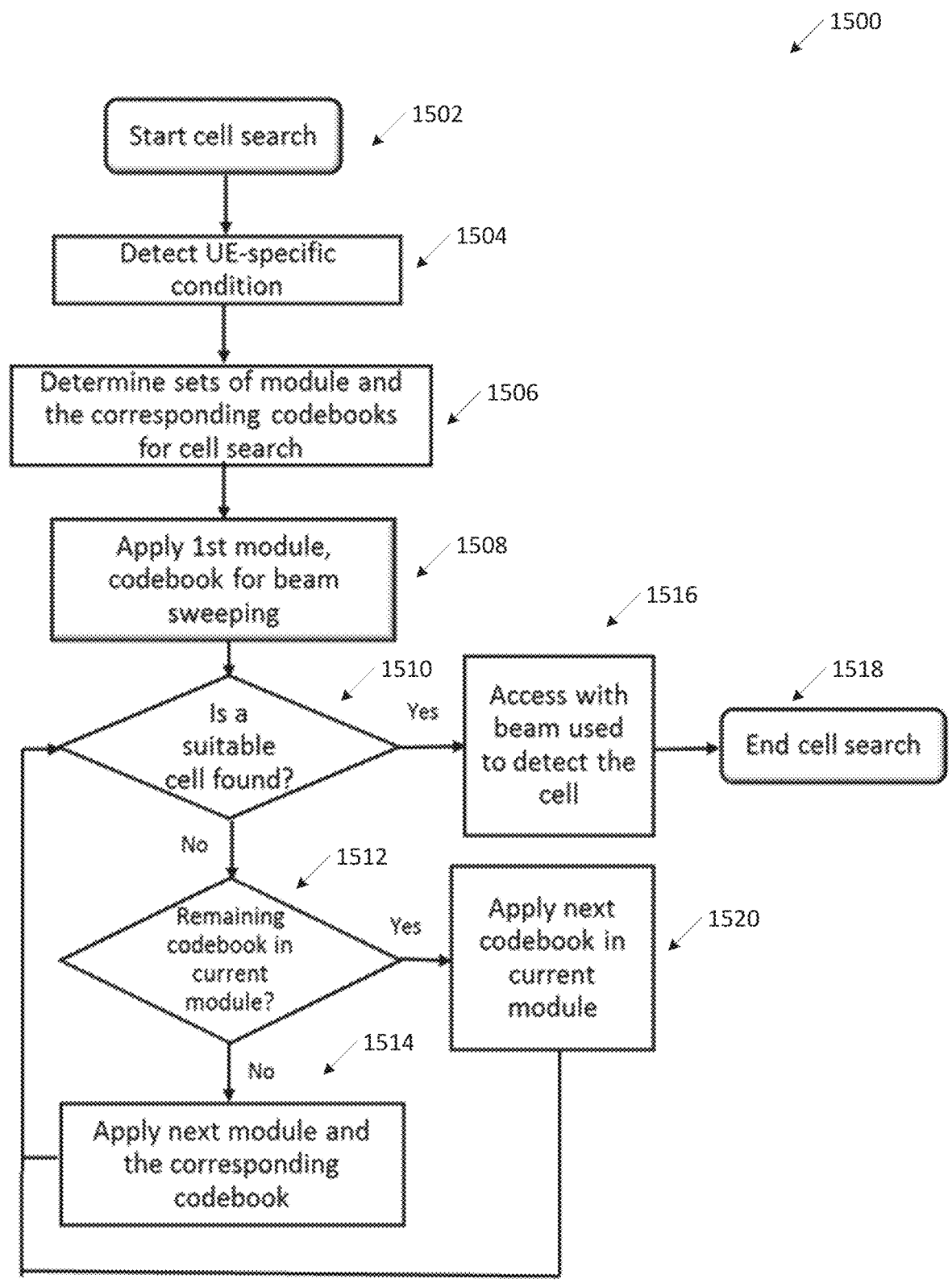
FIG. 15 illustrates a flow chart of a method for a cell searching procedure with multiple RF modules and beam codebooks according to embodiments of the present disclosure.

FIG. 15 illustrates a flow chart of a method 1500 for a cell searching procedure with multiple RF modules and beam codebooks according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the method 1500 starts a cell search. In step 1504, the method 1500 detects UE-specific condition. In step 1506, the method 1500 determines sets of module and the corresponding codebooks for the cell search. In step 1508, the method 1500 applies $1^{st}$ module, codebook for beam sweeping. In step 1510 the method 1500 determines whether a suitable cell is found. If the suitable cell is found in step 1510, the method 1500 performs an access with beam used to detect the cell in step 1516. In step 1518, the method 1500 ends the cell search. In step 1510, if no suitable cell is found, the method 1500 determines whether the codebook remains in current module in step 1512. In step 1512, if the codebook remains, the method 1500 applies next codebook in the current module in step 1520. In step 1512, if no codebook remains, the method 1500 applies next module and the corresponding codebook is step 1514.

In one embodiment, the UE's specific condition is used to guide or determine the set of RF modules and the corresponding beam codebooks used for cell searching. More generally, the UE's specific condition is used to guide or determine the search sequence of the set of RF modules and the corresponding beam codebooks for cell searching. An example of the procedure is illustrated in FIG. 15.

In one embodiment, the RF module and the beam codebook that is used successfully in cell search or connection as well as the UE location information (e.g. from GPS) is recorded. In this case, the UE-specific condition is the UE location. The UE location information can be the GPS coordinates or other location information formats. The data can be stored in the device memory. The data can be used to speed up cell searching or beam management process when the UE needs to perform cell searching or beam search at the same or around the same location.

Figure 16:
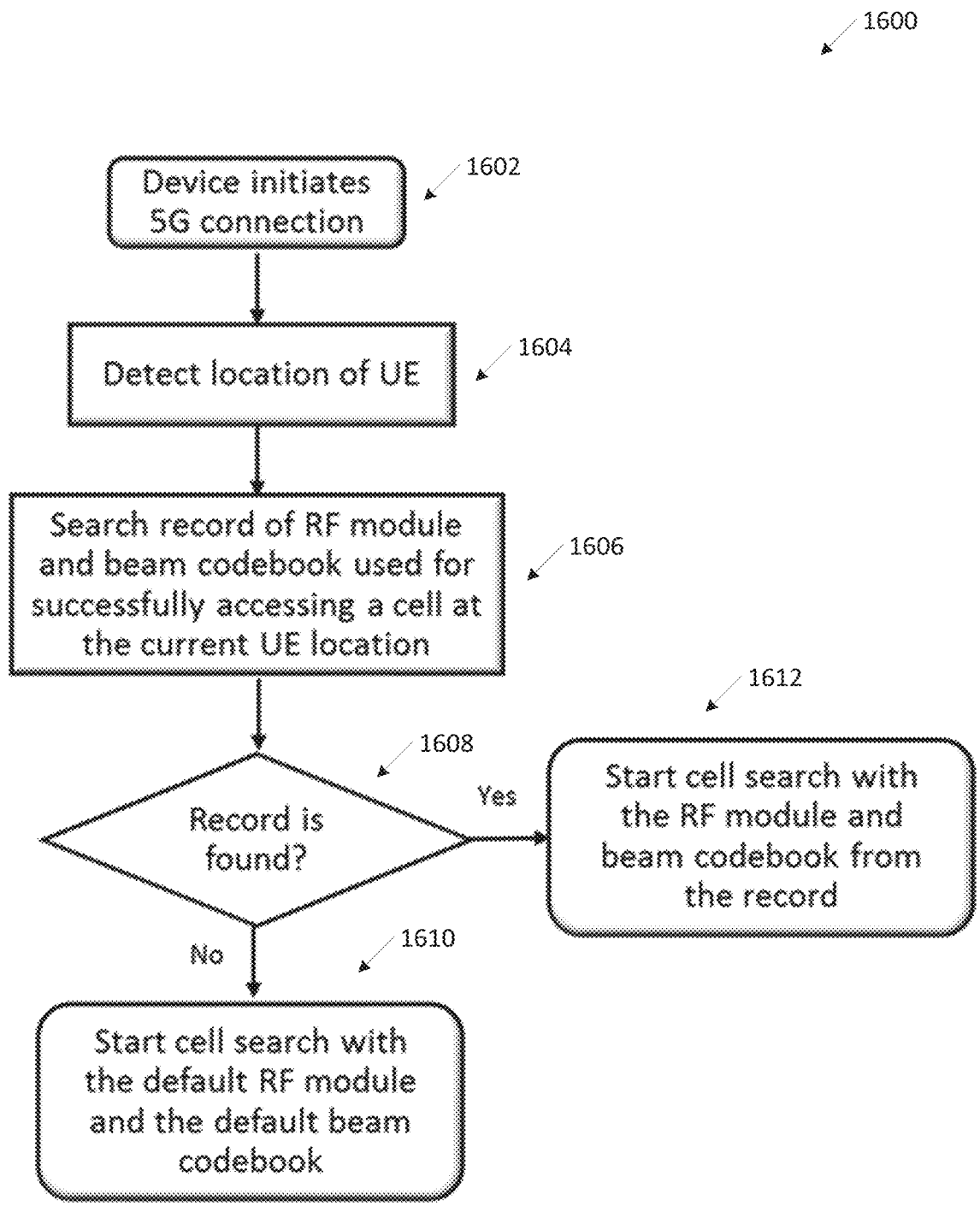
FIG. 16 illustrates a flow chart of a method for utilization of UE location information in determining RF module and beam codebook for cell search according to embodiments of the present disclosure.

FIG. 16 illustrates a flow chart of a method 1600 for utilization of UE location information in determining RF module and beam codebook for cell search according to embodiments of the present disclosure, as performed by a device. The embodiment of the method 1600 illustrated in FIG. 16 is for illustration only. FIG. 16 does not limit the scope of this disclosure to any particular implementation.

As illustrated in FIG. 16, the method 1600 begins at step 1602. The device initiates 5G connection in step 1602. In step 1604, the device detects a location of a UE. In step 1606, the device searched record of RF module and beam codebook used for successfully accessing a cell at the current UE location. In step 1608, the device determines whether record is found. In step 1608, the device finds the record, the device starts a cell search with the RF module and beam codebook from the record in step 1612. If no record is found in step 1608, the device starts cell search with the default RF module and the default beam codebook in step 1610.

In particular, if the record exists, the UE first uses the last RF module and/or the beam codebook that was successfully used in cell search or beam search at the same or around the same location for performing cell searching; else the UE applies the default RF module and beam codebook search sequence. The procedure is illustrated in FIG. 16. If the RF module and/or the beam codebook from the record do not result in a successful cell search or beam search, the UE applies the default RF module and beam codebook search sequence, possibly minus the unsuccessful RF module and/or the beam codebook.

In one example, utilizing the UE location information is beneficial to reduce the cell search or beam search latency for UEs located in the cell edge and requires narrow beams to acquire sufficient link quality. The beam codebook with narrow beams can be used first if the UE is determined to be at a cell edge location. In one alternative, instead of prioritizing the last successful RF module and/or codebook, the UE prioritizes the use of the RF module and/or the beam codebook that has the highest success rate in past cell searches or beam searches, or the highest usage rate in past connections at the same or around the same location; else the UE applies the default RF module and beam codebook search sequence.

In one embodiment, the statistics of the RF module and the beam codebook used for cell search or connection in terms of the rate of success or usage is recorded. A beam is considered used if it is used for data communication. This usage of a beam for communication can be identified from the communication baseband module. For example, assume the UE has two RF modules, module A and module B. It is further assumed that each module has two beam codebooks, i.e. codebook A-1 and A-2 for module A; and codebook B-1 and B-2 for module B.

The percentage or the number of times or the probability a combination of RF module and codebook is selected can be recorded in a table such as TABLE 1, where $\Sigma_i \alpha_i = 1$. There can be one table for each UE-specific condition, e.g. the UE location. The search sequence for the RF modules and the beam codebooks can be determined from $\alpha_i$, specifically, the order of search is according to the decreasing $\alpha_i$ value; in other words, the module and codebook with the largest $\alpha_i$ is searched first, followed by the second largest and so on. The procedure as illustrated in FIG. 15 and FIG. 16 can be applied with the sequence of search as determined by the UE-specific condition.

TABLE 1

| Usage rate of RF modules and beam codebooks | | |
| --- | --- | --- |
| RF module | Beam codebook | Usage rate |
| Module A | Codebook A-1 | $\alpha_1$ |
|  | Codebook A-2 | $\alpha_2$ |
| Module B | Codebook B-1 | $\alpha_3$ |
|  | Codebook B-2 | $\alpha_4$ |

The detection of UE-specific condition can be taken some time to complete at the terminal. In order to minimize the cell search or beam search latency, the RF module and beam codebook search can be performed according to the default sequence, while the UE-specific condition is being determined. After the UE-specific condition has been determined, the default sequence is terminated or suspended if the search is not yet successful, and the search sequence corresponding to the UE-specific condition can be performed. If the search is successful before the UE-specific condition has been determined, the successful RF module and/or the beam codebook can be recorded.

In one embodiment, the RF module and the beam codebook that is used successfully in cell search as well as the data from the gyroscope is recorded. The data can be stored in the device memory. The aforementioned procedures as described for the UE location can also be applied to the gyroscope data.

In one embodiment, the RF module and the beam codebook that is used successfully in cell search as well as the data from the IMU is recorded. The data can be stored in the device memory. The aforementioned procedures as described for the UE location can also be applied to the IMU data.

In one embodiment, the UE-specific condition is a combination of the data from GPS, gyroscope, IMU, clock and other data types. The data can be stored in the device memory. The aforementioned procedures can be applied to the UE-specific condition as determined by a combination of the data types.

Figure 17:
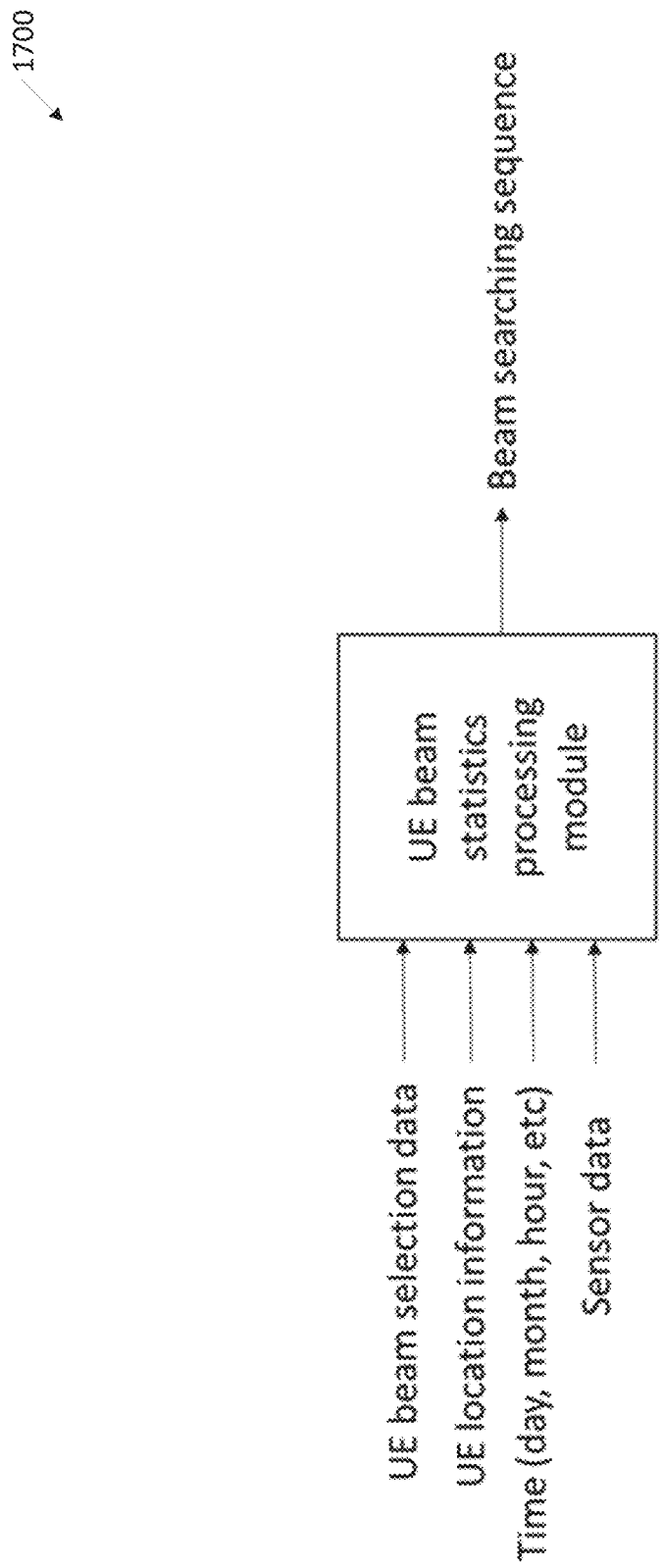
FIG. 17 illustrates an example UE beam statistics processing circuit according to embodiments of the present disclosure.

FIG. 17 illustrates an example UE beam statistics processing circuit 1700 according to embodiments of the present disclosure. The embodiment of the UE beam statistics processing module 1700 illustrated in FIG. 17 is for illustration only. FIG. 17 does not limit the scope of this disclosure to any particular implementation.

FIG. 17 shows a UE beam statistics processing module that obtains the UE beam selection data, the UE location data and the various sensor data, processes the data and determines the beam searching sequence (within and across RF modules). TABLE 2 shows a mapping table between the UE-specific conditions and the beam searching sequences. This table is updated and can be stored in the internal memory of the terminal.

TABLE 2

UE-specific condition to beam searching sequence mapping

| UE-specific condition | Beam searching sequence |
| --- | --- |
| Condition 1 | Sequence 1 |
| Condition 2 | Sequence 2 |
| ... | ... |
| Condition N | Sequence N |

To reduce the memory size required to store the data, data recording can be performed (or prioritized) at the locations where the UE can be found with high probability. The locations where the UE can be found with high probability can be determined by sampling the location information obtained from sensor such as the GPS on the UE, and other sensor that provides similar information, and by determining the locations (or a geographical area) that are registered/recorded with relatively higher number of occurrence.

For example, data can be stored when the user is at home and/or work place, or other locations where the user can be found with high probability, e.g. the UE is at the location with probability above a threshold, $0<T<1$ (e.g. $T=0.5$), which can be configurable.

Figure 18:
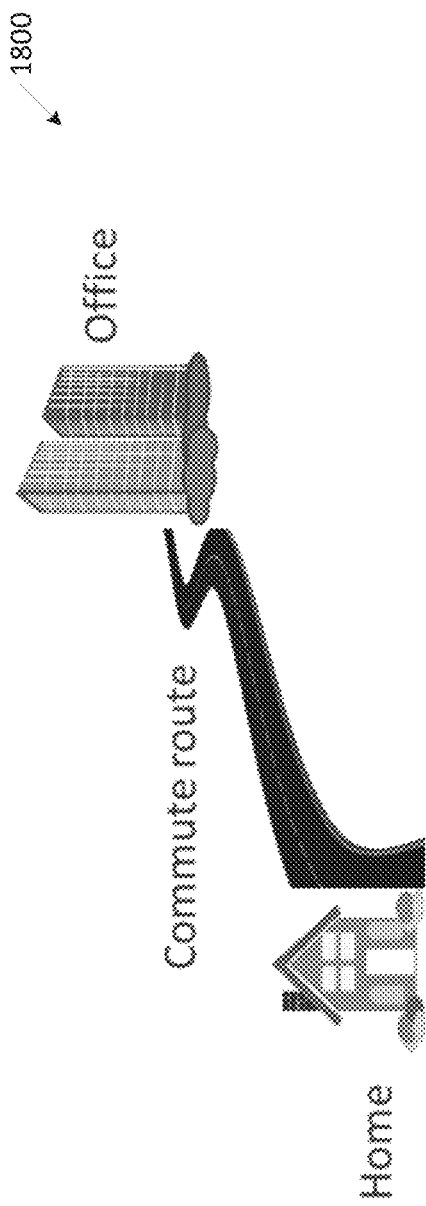
FIG. 18 illustrates an example high probability location according to embodiments of the present disclosure.

FIG. 18 illustrates an example high probability location 1800 according to embodiments of the present disclosure. The embodiment of the high probability location 1800 illustrated in FIG. 18 is for illustration only. FIG. 18 does not limit the scope of this disclosure to any particular implementation.

Figure 19:
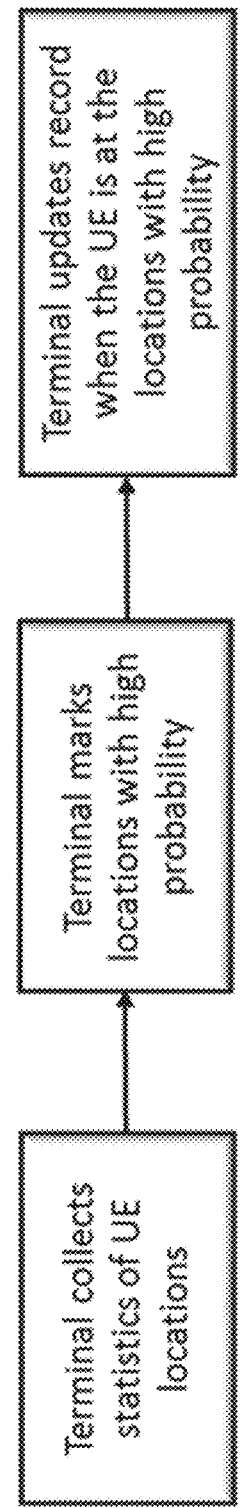
FIG. 19 illustrates an example record updates at locations with high probability according to embodiments of the present disclosure.

FIG. 19 illustrates an example record updates 1900 at locations with high probability according to embodiments of the present disclosure. The embodiment of the record updates 1900 illustrated in FIG. 19 is for illustration only. FIG. 19 does not limit the scope of this disclosure to any particular implementation.

In another example, a UE's location with high probability is user's daily commute route (see FIG. 18). The location can be a geographical area and not necessarily a point in space. An example overall process is illustrated in FIG. 19. By prioritizing record keeping for high probability locations, the table size of TABLE 2 (representing the database) can be significantly smaller.

The prioritization scheme of data recording can be extended from space (location) dependent to space-time dependent. In other words, combination of location and time for the UE with high probability is first determined. The time information can refer to a time period in hours (other time resolution is also possible). The record is then updated when the UE is at the space and time that has been to determine to be of high probability. It may be referred the condition where the UE is at space and/or time that has been to determine to be of high probability as "prioritized condition."

Figure 20:
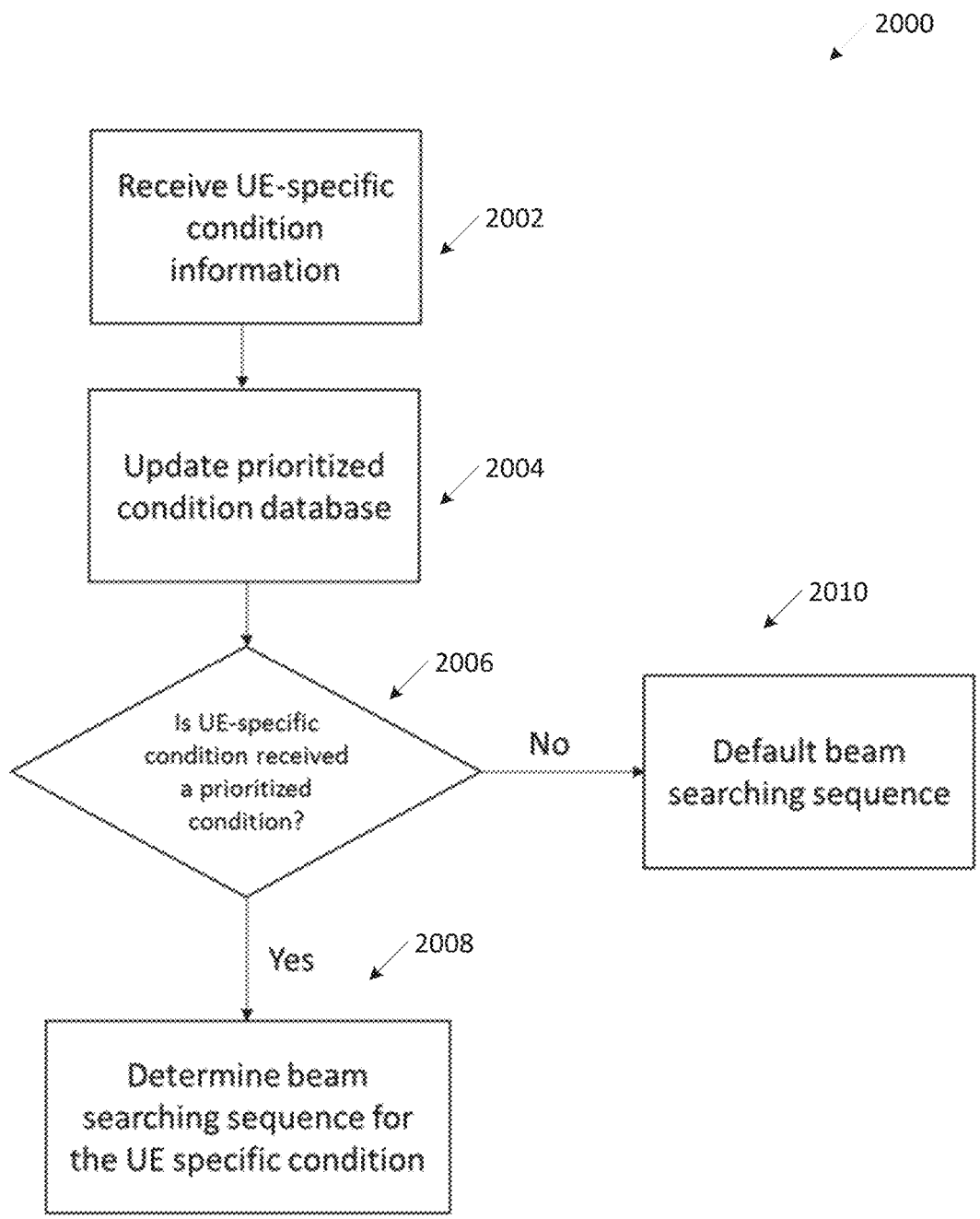
FIG. 20 illustrates a flow chart of a method for a UE beam statistics processing module with prioritized condition database according to embodiments of the present disclosure.

FIG. 20 illustrates a flow chart of a method 2000 for a UE beam statistics processing module with prioritized condition database according to embodiments of the present disclosure. The embodiment of the method 2000 illustrated in FIG. 20 is for illustration only. FIG. 20 does not limit the scope of this disclosure to any particular implementation.

FIG. 20 shows the procedure of prioritized condition update and beam searching sequence determination by the UE beam statistics processing module. The UE beam statistic processing module receives the inputs and updates the list of prioritized conditions, i.e. a new condition may be added as prioritized and/or an existing prioritized condition may be removed of its priority status. If the received UE-specific condition is a prioritized condition, then the beam searching sequence is determined and is the output of the module.

As illustrated in FIG. 20, the method 2000 begins at step 2002. In step 2002, the method 2000 receives UE-specific condition information. In step 2004, the method 2000 updates prioritized condition database. In step 2006, the method 2000 determines whether UE-specific condition is received a prioritized condition. In step 2006, if the method 2000 determines a UE-specific condition, the method 2000 performs a default beam searching sequence in step 2010. In step 2006, no UE-specific condition is determined, the method 2000 determines beam searching sequence for the UE specific condition in step 2008.

Figure 21:
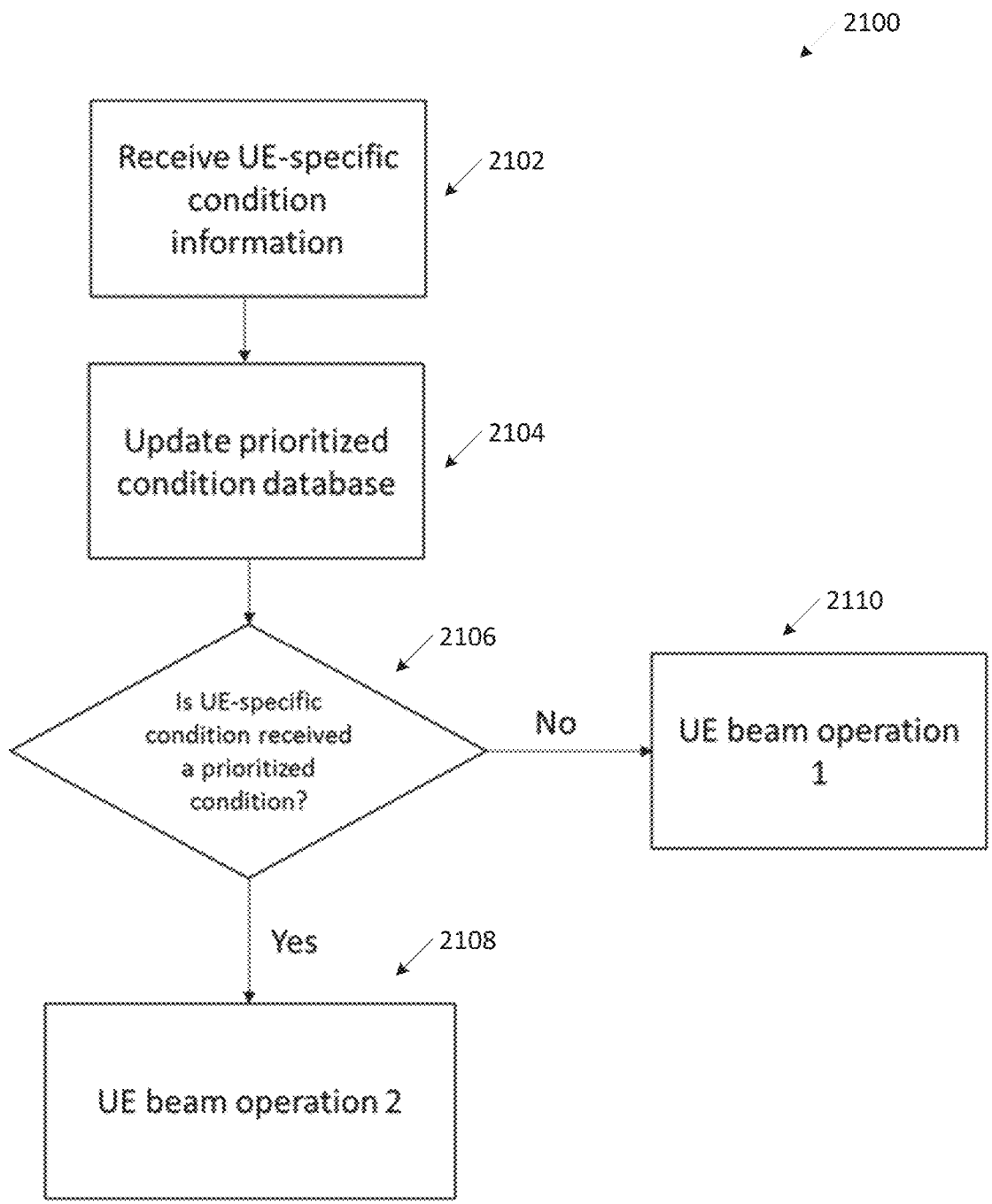
FIG. 21 illustrates a flow chart of a method for a UE beam operation with prioritized condition database according to embodiments of the present disclosure.

FIG. 21 illustrates a flow chart of a method 2100 for a UE beam operation with prioritized condition database according to embodiments of the present disclosure. The embodiment of the method 2100 illustrated in FIG. 21 is for illustration only. FIG. 21 does not limit the scope of this disclosure to any particular implementation.

As illustrated in FIG. 21, the method 2100 begins at step 2102. In step 2102, the method 2100 receives UE-specific condition information. In step 2104, the method 2100 updates prioritized condition database. In step 2106, the method 2100 determines whether UE-specific condition is received a prioritized condition. In step 2106, if the method 2100 determines UE-specific condition is received a prioritized condition, the method 2100 performs a UE beam operation 2 in step 2108. In step 2106, no received, the method 2100 performs UE beam operation 1 in step 2110.

More generally, the output of the UE beam statistic processing module can be a certain UE beam operation, including UE beam codebook selection or searching sequence or generation, a UE beam selection or searching sequence or generation, a UE antenna module selection or searching sequence, a UE antenna array selection or searching sequence, and UE antenna element selection or searching sequence. The procedure is illustrated in FIG. 21, where UE beam operations can be any one or more of the aforementioned operations.

Figure 22:
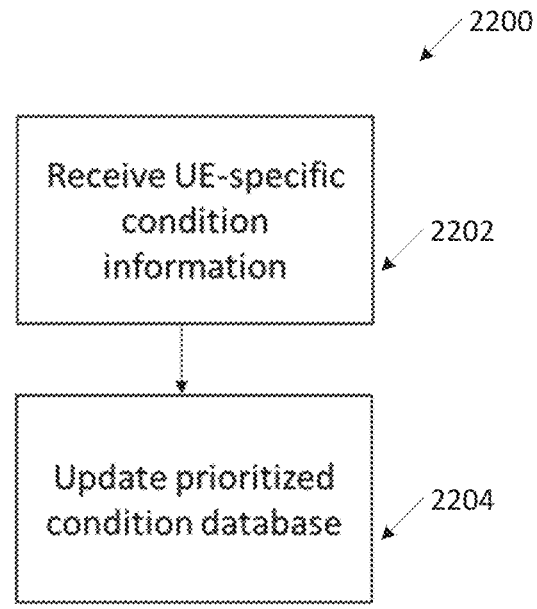
FIG. 22 illustrates a flow chart of a method for a prioritized condition database update according to embodiments of the present disclosure.

FIG. 22 illustrates a flow chart of a method 2200 for a prioritized condition database update according to embodiments of the present disclosure. The embodiment of the method 2200 illustrated in FIG. 22 is for illustration only. FIG. 22 does not limit the scope of this disclosure to any particular implementation.

As illustrated in FIG. 22, in step 2202, the method 2200 receives UE-specific condition information. In step 2204, the method 2200 updates prioritized condition database.

Figure 23:
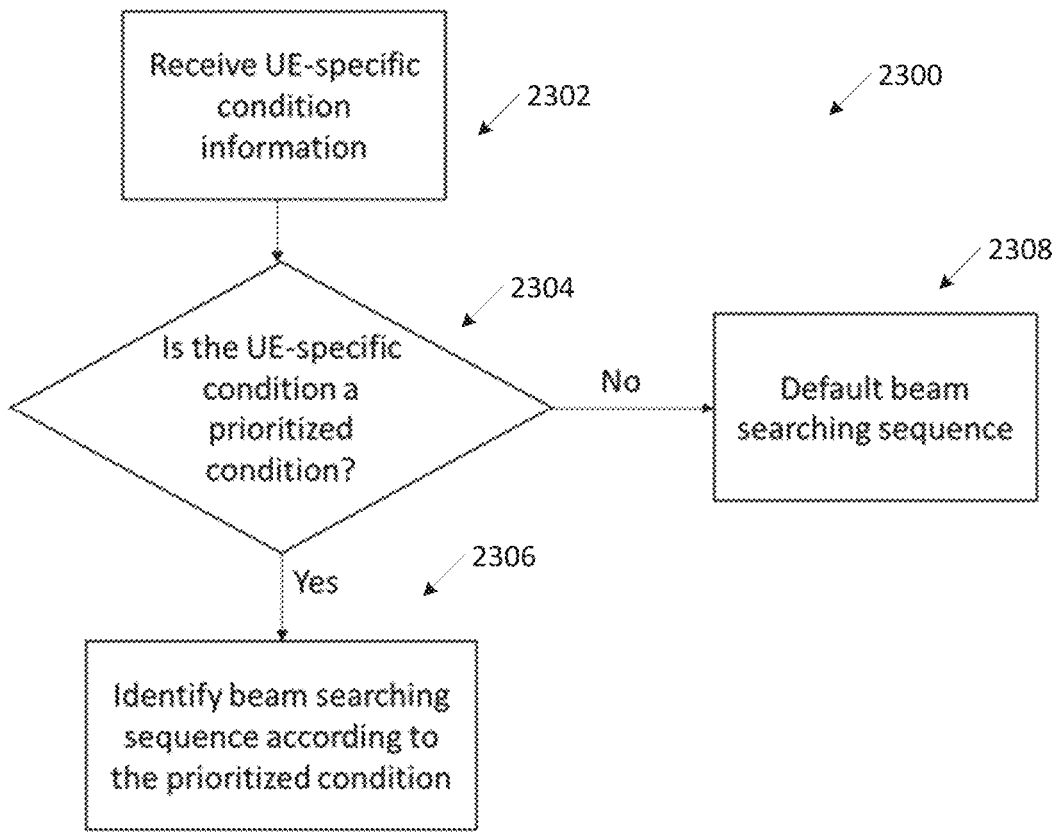
FIG. 23 illustrates a flow chart of a method for a UE beam operation with prioritized condition database according to embodiments of the present disclosure.

FIG. 23 illustrates a flow chart of a method 2300 for a UE beam operation with prioritized condition database according to embodiments of the present disclosure. The embodiment of the method 2300 illustrated in FIG. 23 is for illustration only. FIG. 23 does not limit the scope of this disclosure to any particular implementation.

As illustrated in FIG. 23 the method 2300 begins at step 2302. In step 2302, the method 2300 receives UE-specific condition information. In step 2304, the method 2300 determines whether UE-specific condition is a prioritized condition. In step 2304, the method 2300 determines whether UE-specific condition is a prioritized condition. In step 2304, if the method 2300 determines the UE-specific condition is a prioritized condition, the method in step 2306 identifies beam searching sequence according to the prioritized condition. In step 2308, no prioritized condition is determined in step 2304, the method 2300 performs a default beam searching sequence in step 2308.

Figure 24:
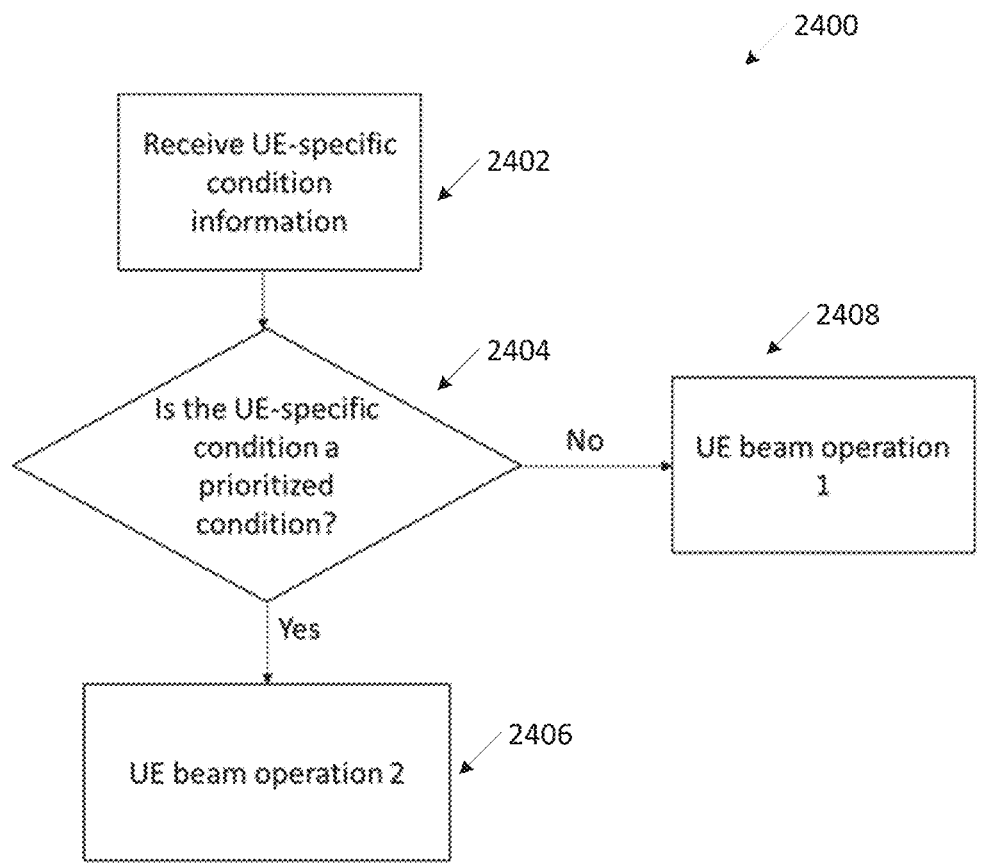
FIG. 24 illustrates another flow chart of a method for UE beam operation with prioritized condition database according to embodiments of the present disclosure.

FIG. 24 illustrates another flow chart of a method 2400 for UE beam operation with prioritized condition database according to embodiments of the present disclosure. The embodiment of the method 2400 illustrated in FIG. 24 is for illustration only. FIG. 24 does not limit the scope of this disclosure to any particular implementation.

As illustrated in FIG. 24, the method 2400 begins at step 2402. In step 2402, the method 2400 receives UE-specific condition information. In step 2404, the method 2400 determines whether UE-specific condition is a prioritized condition. In step 2404, if the method 2400 determines UE-specific condition is a prioritized condition, the method 2400 in step 2406 performs a UE beam operation 2. In step 2404, if the UE-specific conditions are not the prioritized condition, the method 2400 performs a UE beam operation in step 2408.

In one embodiment, the updating of prioritized condition database and the UE beam operation determination based on the UE-specific condition information are performed separately, including performed by separate modules, or at different time instances, or at different time intervals and so on. This is illustrated in FIG. 22, FIG. 23, and FIG. 24, whereby FIG. 22, FIG. 23, and FIG. 24 are shown as separate procedures.

Figure 25:
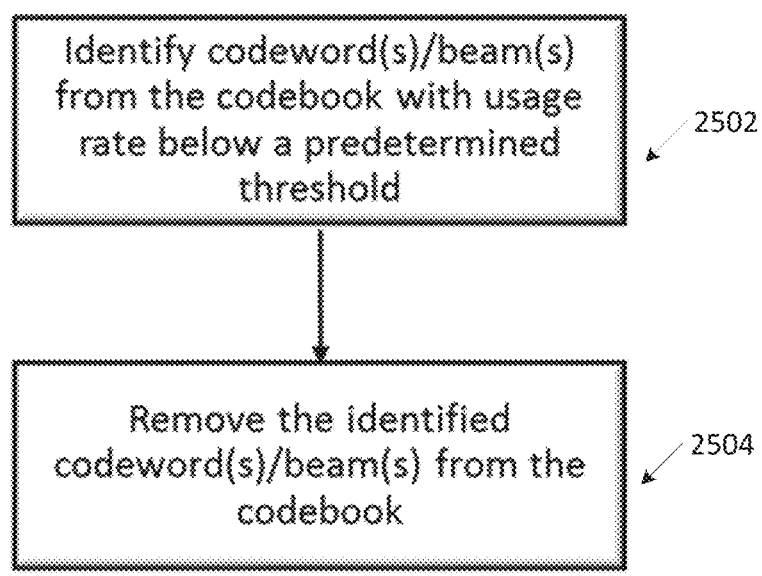
FIG. 25 illustrates a flow chart of a method for a codeword removal by the terminal according to embodiments of the present disclosure.

FIG. 25 illustrates a flow chart of a method 2500 for a codeword removal by the terminal according to embodiments of the present disclosure. The embodiment of the method 2500 illustrated in FIG. 25 is for illustration only. FIG. 25 does not limit the scope of this disclosure to any particular implementation.

As illustrated in FIG. 25, the method 2500 in step 2502 identifies codeword(s)/beam(s) from the codebook with usage rate below a predetermined threshold. In step 2504, the method 2500 removes the identified codeword(s)/beam(s) from the codebook.

In one embodiment, based on the statistics of usage rate, the terminal can deprioritize or exclude (remove) the RF module or beam codebook or beam codeword that has not be utilized for a long period of time can be deprioritized or excluded from the beam sweeping procedure, which can further reduce the latency of beam sweeping. This can be performed by the UE beam statistics processing module. An example flowchart for removal of codeword is given in FIG. 25.

Figure 26:
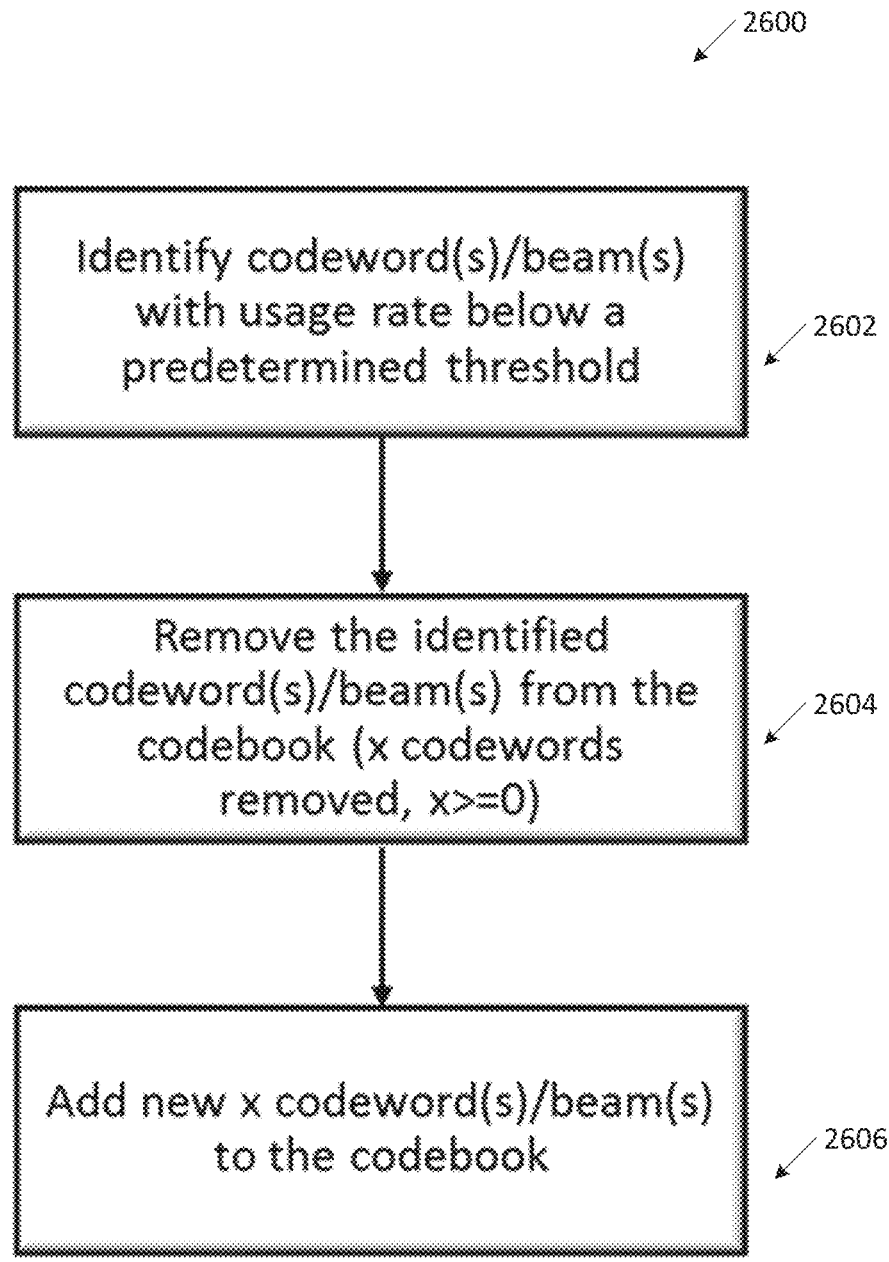
FIG. 26 illustrates a flow chart of a method for a codebook update by the terminal according to embodiments of the present disclosure.

FIG. 26 illustrates a flow chart of a method 2600 for a codebook update by the terminal according to embodiments of the present disclosure. The embodiment of the method 2600 illustrated in FIG. 26 is for illustration only. FIG. 26 does not limit the scope of this disclosure to any particular implementation.

As illustrated in FIG. 26, the method 2600 in step 2602 identifies codeword(s)/beam(s) with usage rate below a predetermined threshold. In step 2604, the method 2600 removes the identified codeword(s)/beam(s) from the codebook (x codewords removed, x=>0). In step 2606, the method 2600 adds new x codeword(s)/beam(s) to the codebook.

In one option, the terminal can replace the codeword with usage rate below a threshold with another codeword. This can be performed by the UE beam statistics processing module. An example flowchart for removal of codeword is given FIG. 26.

Furthermore, the terminal can send an indication to the user (e.g. achieved by indication from physical layer all the way to the application layer) to inform the user of the condition if the condition is considered abnormal due to possible damage or permanent blockage from an object close to the RF module (e.g. from phone's protective casing). Action can then be taken by the user to fix the damage or to remove the blockage.

It should be noted that the embodiments can be applied to neighboring cell search in radio resource management (RRM) procedure.

To enable user choice of enhanced beam searching, the option of user consent can be provided on a user interface of the mobile terminal. The option of user consent can be provided in the "connection" setting on the terminal, for "enhanced 5G mmWave beam searching." Other locations are not precluded. If the "enhanced 5G mmWave beam learning and update" option is turned on, the user's beam data and the necessary contextual information are collected, and the beam searching sequence determination is performed by the UE beam statistics processing module; else the user's data is not collected and the beam searching sequence determination is not performed.

Figure 27:
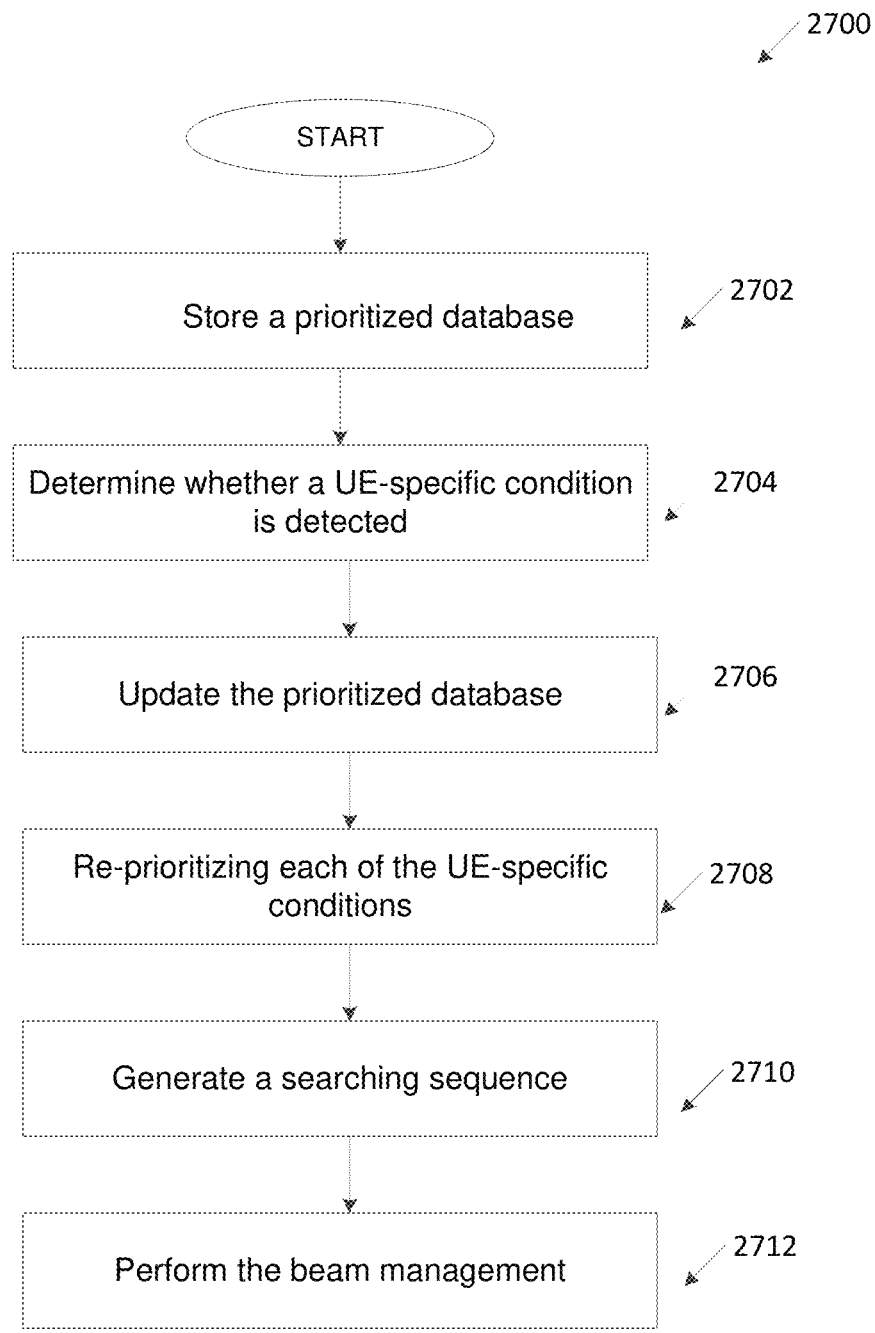
FIG. 27 illustrates a flow chart of a method for beam management according to embodiments of the present disclosure.

FIG. 27 illustrates a flow chart of a method 2700 for beam management according to embodiments of the present disclosure, as may be performed by a user equipment (UE) (e.g., 111-1116 as illustrated in FIG. 1). The embodiment of the method 2700 illustrated in FIG. 27 is for illustration only. FIG. 27 does not limit the scope of this disclosure to any particular implementation.

As shown in FIG. 27, the method 2700 begins at step 2702. In step 2702, a UE stores a prioritized database comprising information regarding UE-specific conditions that are detectable by the UE, wherein each of the UE-specific conditions is prioritized.

In one embodiment, the UE in step 2702 further detects location information of the UE, determine whether a record used for the location information of the UE is stored in the prioritized database, the record comprising information of radio frequency (RF) that is mapped to one or more beam codebooks each of which includes a usage rate, and performing a cell searching based on the record used for the location information of the UE.

In such embodiment, a UE-specific condition is the UE location. The UE location information can be the GPS coordinates or other location information formats. The data can be stored in the device memory. The data can be used to speed up cell searching or beam management process when the UE needs to perform cell searching or beam search at the same or around the same location.

In such embodiment, the UE-specific condition comprises at least one of a protocol state of the UE, an activity of a user, a location of the UE, an orientation of the UE, a UE blockage condition by a user, or a channel environment.

In one embodiment, the UE in step 2702, further detects the UE-specific condition through at least one of a set of sensors, an inertial measurement unit (IMU), or a global positioning system (GPS).

In one embodiment, the UE in step 2702 further identifies a default searching sequence for the beam management, the default searching sequence being used for the beam management when the prioritized database does not include the UE-specific condition for the beam management. In such embodiment, the UE-specific conditions and the beam searching sequence are correspondingly mapped each other and stored in the memory of the UE.

In one embodiment, the UE in step 2702, further generate, to a user, an indication indicating whether a condition of the user for using the UE is abnormal based on a temporary or permanent blockage. In such embodiment, the UE may send an indication to the user (e.g. achieved by indication from physical layer all the way to the application layer) to inform the user of the condition if the condition is considered abnormal due to possible damage or permanent blockage from an object close to the RF module (e.g. from phone's protective casing). Action can then be taken by the user to fix the damage or to remove the blockage.

In step 2704, the UE determines whether a UE-specific condition is detected. In step 2704, it may be referred to system optimization as the design of procedure/algorithm to determine which RF beam(s) in which RF module of the UE to employ given a UE-specific condition. In such instance, the UE-specific condition can be determined by the channel condition as well as the protocol state of the UE. Channel condition includes desired and interfering signal channel conditions, effects of UE orientation, hand or body or object blockages, and movement of the UE. Protocol state refers to the UE modem's connectivity status or activity.

In step 2706, the UE updates the prioritized database including the UE-specific condition based on a result of the determination. In step 2706, to reduce the memory size required to store the data, data recording can be performed (or prioritized) at the locations where the UE can be found with high probability.

In step 2708, the UE re-prioritizes each of the UE-specific conditions included in the prioritized database based on a usage probability of the UE-specific condition. In one example, the locations where the UE can be found with high probability can be determined by sampling the location information obtained from sensor such as the GPS on the UE, and other sensor that provides similar information, and by determining the locations (or a geographical area) that are registered/recorded with relatively higher number of occurrence.

In step 2710, the UE generates a searching sequence for beam management based on the prioritized database, wherein the searching sequence is mapped to each of the UE-specific conditions In step 2712, the UE performs the beam management based on the generated searching sequence.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a memory configured to store a database comprising information regarding UE-specific conditions that are detectable by the UE, wherein each of the UE-specific conditions is prioritized; and
   at least one processor operably connected to the memory, the at least one processor configured to:
   determine whether a UE-specific condition is detected;
   update the database including the UE-specific condition based on a result of the determination;
   re-prioritize each of the UE-specific conditions included in the database based on a usage probability of the UE-specific condition;
   generate a searching sequence for beam management based on the database, wherein the searching sequence is mapped to each of the UE-specific conditions; and
   perform the beam management based on the generated searching sequence.

2. The UE of claim 1, wherein the at least one processor is further configured to:
   detect location information of the UE;
   determine whether a record used for the location information of the UE is stored in the database, the record comprising information of radio frequency (RF) that is mapped to one or more beam codebooks each of which includes a usage rate; and
   perform a cell searching based on the record used for the location information of the UE.

3. The UE of claim 1, wherein the UE-specific condition comprises at least one of a protocol state of the UE, an activity of a user, a location of the UE, an orientation of the UE, a UE blockage condition by a user, or a channel environment.

4. The UE of claim 1, wherein the processor is further configured to detect the UE-specific condition through at least one of a set of sensors, an inertial measurement unit (IMU), or a global positioning system (GPS).

5. The UE of claim 1, wherein the processor is further configured to identify a default searching sequence for the beam management, the default searching sequence being used for the beam management when the database does not include the UE-specific condition for the beam management.

6. The UE of claim 1, wherein the usage probability is determined based on at least one of UE beam selection data, location information of the UE, time information, or sensor information.

7. The UE of claim 1, wherein the processor is further configured to generate, and output to a user, an indication that a condition under which the user is using the UE is abnormal based on a temporary or permanent blockage.

8. A method of a user equipment (UE) for beam management, the method comprising:
   storing a database comprising information regarding UE-specific conditions that are detectable by the UE, wherein each of the UE-specific conditions is prioritized;
   determining whether a UE-specific condition is detected;

updating the database including the UE-specific condition based on a result of the determination;
re-prioritizing each of the UE-specific conditions included in the database based on a usage probability of the UE-specific condition;
generating a searching sequence for beam management based on the database, wherein the searching sequence is mapped to each of the UE-specific conditions; and
performing the beam management based on the generated searching sequence.

9. The method of claim 8, further comprising:
detecting location information of the UE;
determining whether a record used for the location information of the UE is stored in the database, the record comprising information of radio frequency (RF) that is mapped to one or more beam codebooks each of which includes a usage rate; and
performing a cell searching based on the record used for the location information of the UE.

10. The method of claim 8, wherein the UE-specific condition comprises at least one of a protocol state of the UE, an activity of a user, a location of the UE, an orientation of the UE, a UE blockage condition by a user, or a channel environment.

11. The method of claim 8, further comprising detecting the UE-specific condition through at least one of a set of sensors, an inertial measurement unit (IMU), or a global positioning system (GPS).

12. The method of claim 8, further comprising identifying a default searching sequence for the beam management, the default searching sequence being used for the beam management when the database does not include the UE-specific condition for the beam management.

13. The method of claim 8, wherein the usage probability is determined based on at least one of UE beam selection data, location information of the UE, time information, or sensor information.

14. The method of claim 8, further comprising generating, and outputting to a user, an indication that a condition under which the user is using the UE is abnormal based on a temporary or permanent blockage.

15. A non-transitory computer readable medium comprising instructions, that when executed by at least one processor of a user equipment (UE), cause the UE to:
control a memory configured to store a database comprising information regarding UE-specific conditions that are detectable by the UE, wherein each of the UE-specific conditions is prioritized;
determine whether a UE-specific condition is detected;
update the database including the UE-specific condition based on a result of the determination;
re-prioritize each of the UE-specific conditions included in the database based on a usage probability of the UE-specific condition;
generate a searching sequence for beam management based on the database, wherein the searching sequence is mapped to each of the UE-specific conditions; and
perform the beam management based on the generated searching sequence.

16. The non-transitory computer readable medium of claim 15, further comprising instructions, that when executed by the at least one processor, cause the UE to:
detect location information of the UE;
determine whether a record used for the location information of the UE is stored in the database, the record comprising information of radio frequency (RF) that is mapped to one or more beam codebooks each of which includes a usage rate; and
perform a cell searching based on the record used for the location information of the UE.

17. The non-transitory computer readable medium of claim 15, wherein the UE-specific condition comprises at least one of a protocol state of the UE, an activity of a user, a location of the UE, an orientation of the UE, a UE blockage condition by a user, or a channel environment.

18. The non-transitory computer readable medium of claim 15, further comprising instructions, that when executed by the at least one processor, cause the UE to detect the UE-specific condition through at least one of a set of sensors, an inertial measurement unit (IMU), or a global positioning system (GPS).

19. The non-transitory computer readable medium of claim 15, further comprising instructions, that when executed by the at least one processor, cause the UE to:
identify a default searching sequence for the beam management, the default searching sequence being used for the beam management when the database does not include the UE-specific condition for the beam management; and
generate, to a user, an indication indicating whether a condition of the user for using the UE is abnormal based on a temporary or permanent blockage.

20. The non-transitory computer readable medium of claim 15, wherein the usage probability is determined based on at least one of UE beam selection data, location information of the UE, time information, or sensor information.

* * * * *